United States Patent [19]

Goodwin

[11] Patent Number: 4,830,486

[45] Date of Patent: May 16, 1989

[54] FREQUENCY MODULATED LASAR RADAR

[76] Inventor: Frank E. Goodwin, 1300 #5 Mindanao Way, Marina Del Ray, Calif. 90292

[21] Appl. No.: 590,350

[22] Filed: Mar. 16, 1984

[51] Int. Cl.[4] .......................... G01C 3/08; G01B 9/02; G01B 11/24; G01B 5/28

[52] U.S. Cl. .......................................... 356/5; 356/4.5; 356/72; 356/349; 356/371; 356/376; 250/562; 73/105

[58] Field of Search .................. 356/5, 4.5, 371, 72, 356/28.5, 28, 376, 345, 349; 343/14, 9; 250/562, 564; 73/105

[56] References Cited

U.S. PATENT DOCUMENTS

| | | |
|---|---|---|
| 3,523,735 | 4/1966 | Taylor . |
| 3,589,815 | 6/1971 | Hosterman . |
| 3,692,414 | 9/1972 | Hosterman et al. . |
| 3,860,343 | 1/1975 | Janney et al. ............... 356/5 X |
| 3,909,131 | 9/1975 | Waters . |
| 3,923,395 | 12/1975 | Bodlaj ........................... 356/4 |
| 3,986,774 | 10/1976 | Lowrey, Jr. et al. . |
| 4,167,329 | 6/1979 | Jelalian et al. ................. 356/5 |
| 4,181,432 | 1/1980 | Flower ........................ 356/28.5 |
| 4,209,253 | 6/1980 | Hughes . |
| 4,271,412 | 6/1981 | Glass et al. ................... 342/128 |
| 4,284,351 | 8/1981 | Alldritt et al. ................ 356/28.5 |
| 4,290,697 | 9/1981 | McLandrich . |
| 4,299,484 | 11/1981 | Holzapfel .................... 356/28.5 |
| 4,299,491 | 11/1981 | Waters et al. . |
| 4,307,398 | 12/1981 | Ward, Jr. ...................... 342/128 |
| 4,321,602 | 3/1982 | Kipp .............................. 342/128 |
| 4,325,636 | 4/1982 | Schiffner . |
| 4,329,056 | 5/1982 | Lacombat et al. . |
| 4,340,304 | 7/1982 | Massie . |
| 4,344,705 | 8/1982 | Kompa et al. ................. 356/5 |
| 4,355,899 | 10/1982 | Nussmeier . |
| 4,355,900 | 10/1982 | Nussmeier . |
| 4,397,550 | 8/1983 | Matsuda et al. .............. 356/28.5 |
| 4,403,857 | 9/1983 | Holscher ....................... 356/5 |
| 4,511,800 | 4/1985 | Harbeke et al. .............. 356/371 |
| 4,531,833 | 7/1985 | Ohtomo ........................ 356/5 |
| 4,533,242 | 8/1985 | McLauchlan et al. ........ 356/5 |
| 4,537,503 | 8/1985 | Liu ............................... 356/28.5 |
| 4,594,000 | 6/1986 | Falk et al. ..................... 356/5 |
| 4,611,912 | 9/1986 | Falk et al. ..................... 356/5 |

FOREIGN PATENT DOCUMENTS 0027763 4/1981 European Pat. Off. .
8501845 9/1988 European Pat. Off. .
1549525 5/1966 Fed. Rep. of Germany .

OTHER PUBLICATIONS

Department of Defense, Abstract of New Technology from the Air Force Systems Command, "Interferometric Technique for Measuring Distance at Optical Frequencies", Mar. 1977.
Department of Defense, Abstract of New Technology from the Air Force Systems Command, "Self-Calibrating Interferometer for Optical Phase Measurement", Mar. 1977.
Z. Fang and S. Wang, Department of Electrical Engineering and Computer Sciences and the Electronics Research Laboratory, The University of California, Berkeley, California, pp. 13–15, Oct. 4, 1983, "A Three-Segmented Laser, . . . ".

Primary Examiner—Stephen C. Buczinski
Assistant Examiner—Linda J. Wallace
Attorney, Agent, or Firm—Cushman, Darby & Cushman

[57] ABSTRACT

An apparatus and a method for measuring the distance to an arbitrary target includes a radiation source producing a beam of coherent radiation the frequency of which is continuously varied. The beam is divided into a ranging beam and a reference beam. The ranging beam is coupled to a ranging interferometer, which directs a portion of the ranging beam at the target. The ranging interferometer produces a first signal indicative of the phase difference between a portion of the ranging beam directed at and scattered by the target and another portion of the ranging beam which has traveled over a path of fixed length. The reference beam is coupled to a reference interferometer. A portion of the reference beam is directed by the reference interferometer along a reference path of a predetermined length, and the phase difference between the portion of the reference beam directed along the reference path and another portion of the reference beam which has travelled over a path of a fixed length is measured. The number of fringes resulting from the wave interference produced in the ranging interferometer and the number of fringes in the wave interference pattern produced by the reference interferometer are counted and used, together with the known length of the reference path, to determine the distance of the target from the ranging interferometer.

50 Claims, 9 Drawing Sheets

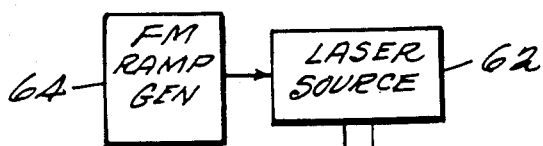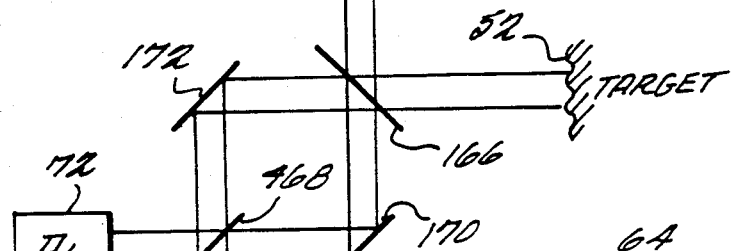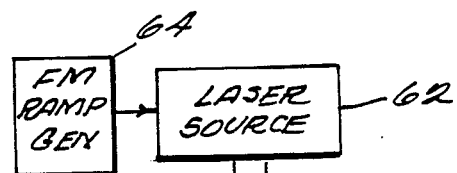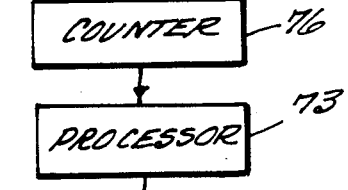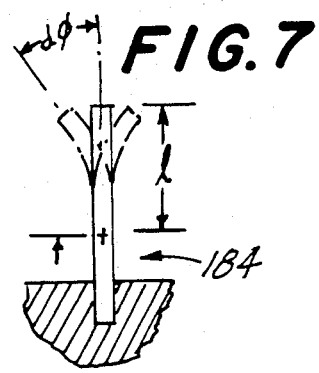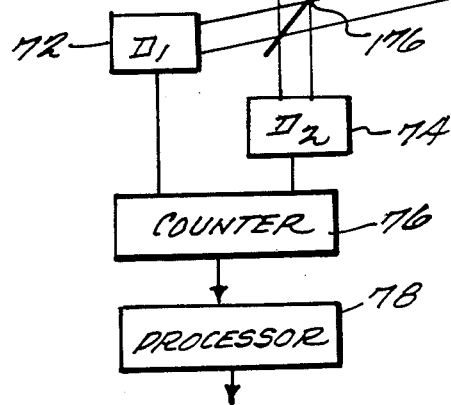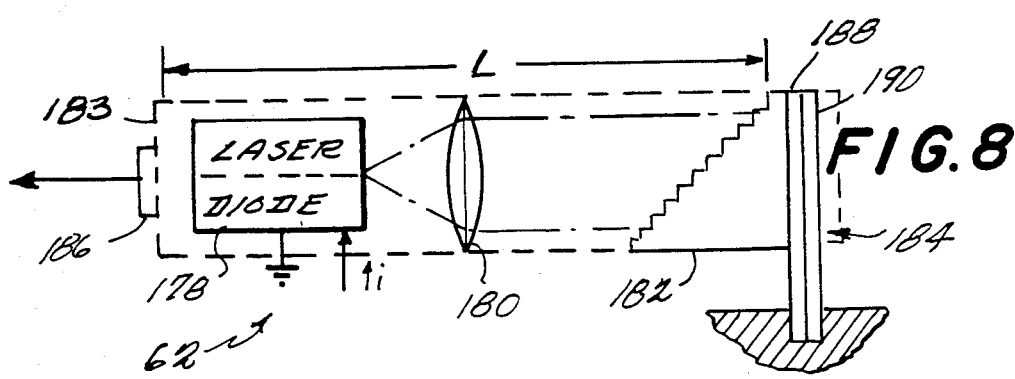

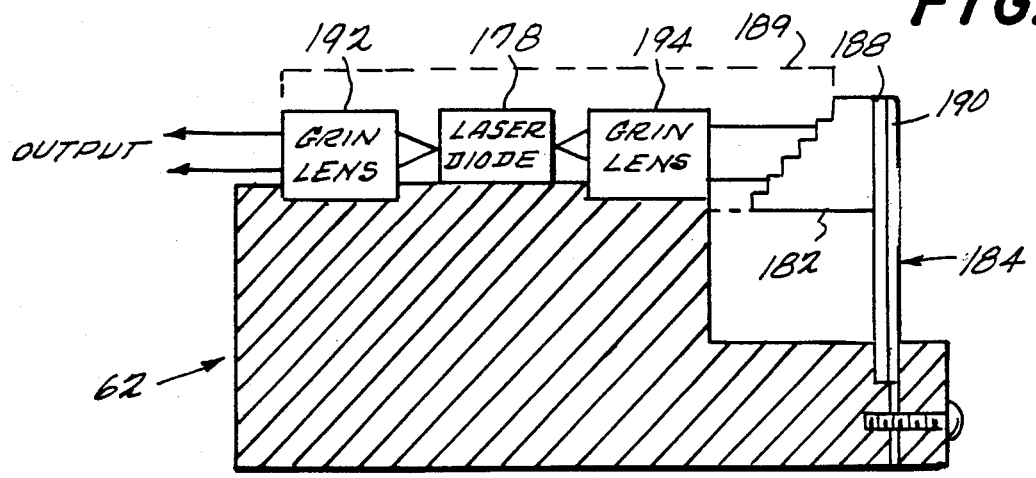
FIG. 9
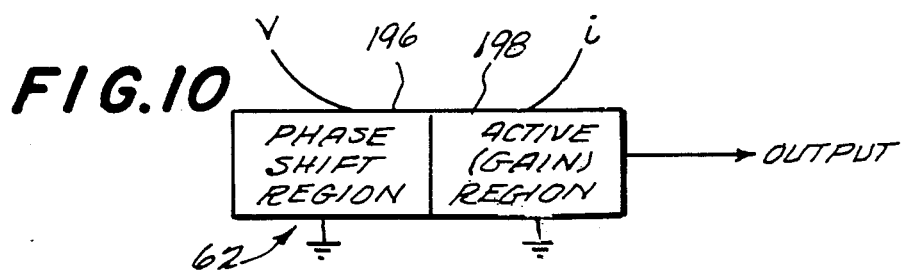
FIG. 10
FIG. 11
(PRIOR ART)
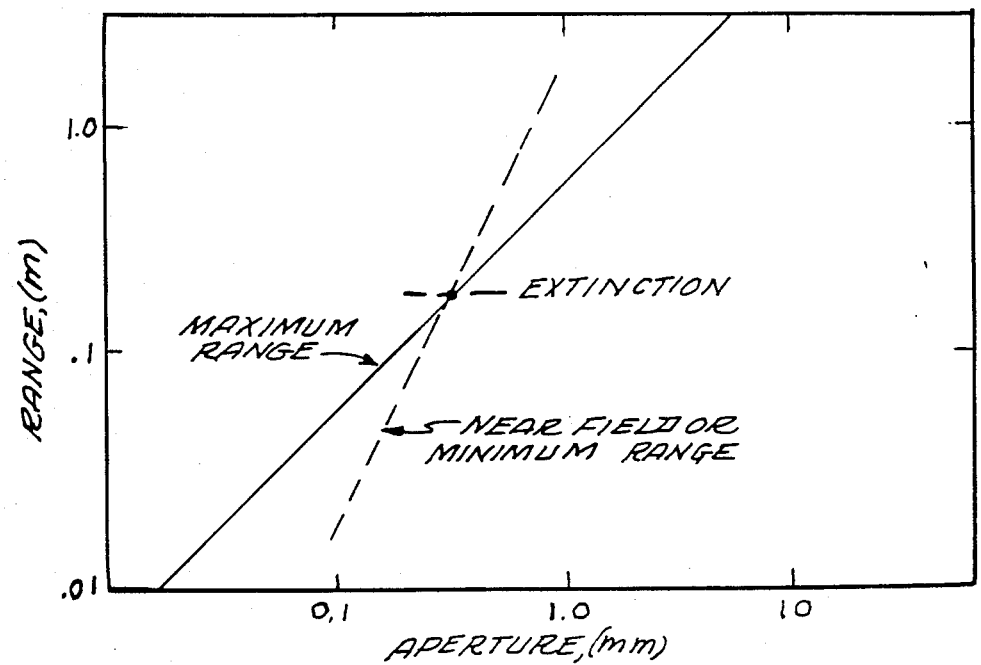

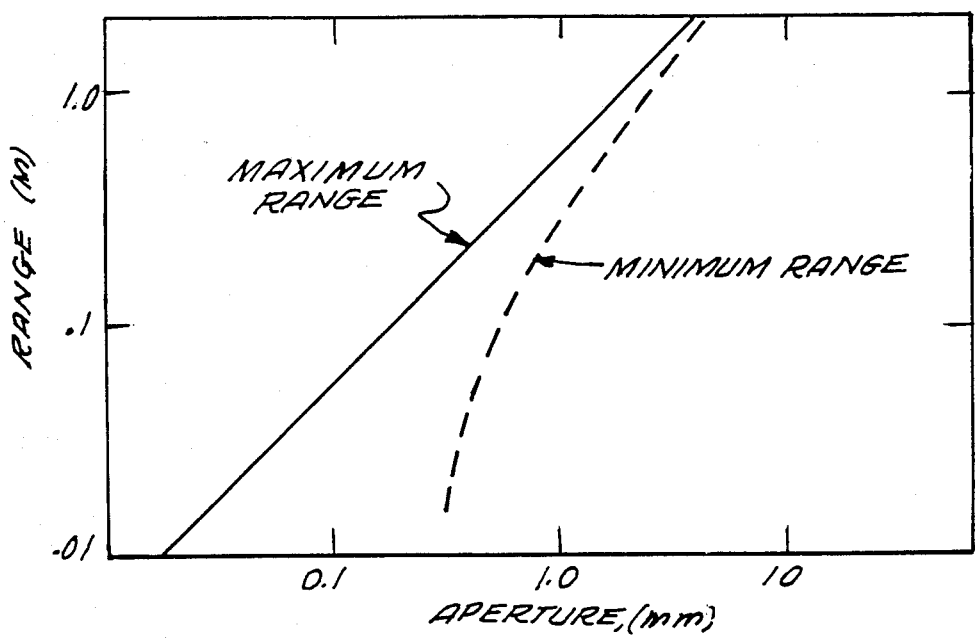
FIG. 12
FIG. 13
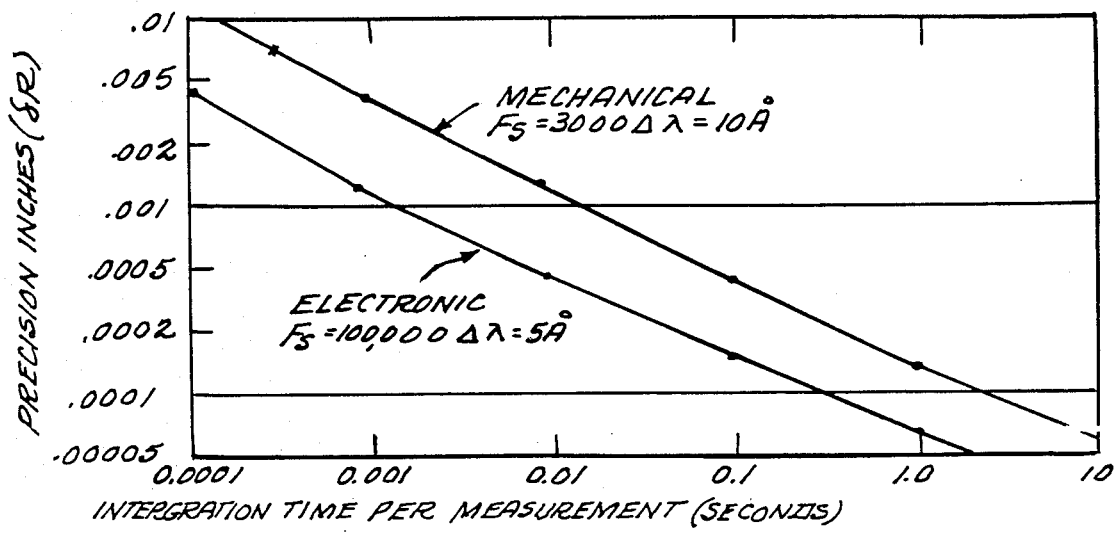

$P_T = 3MW$, REFLECTIVITY = 3%, $B_N = 10^5 Hz$

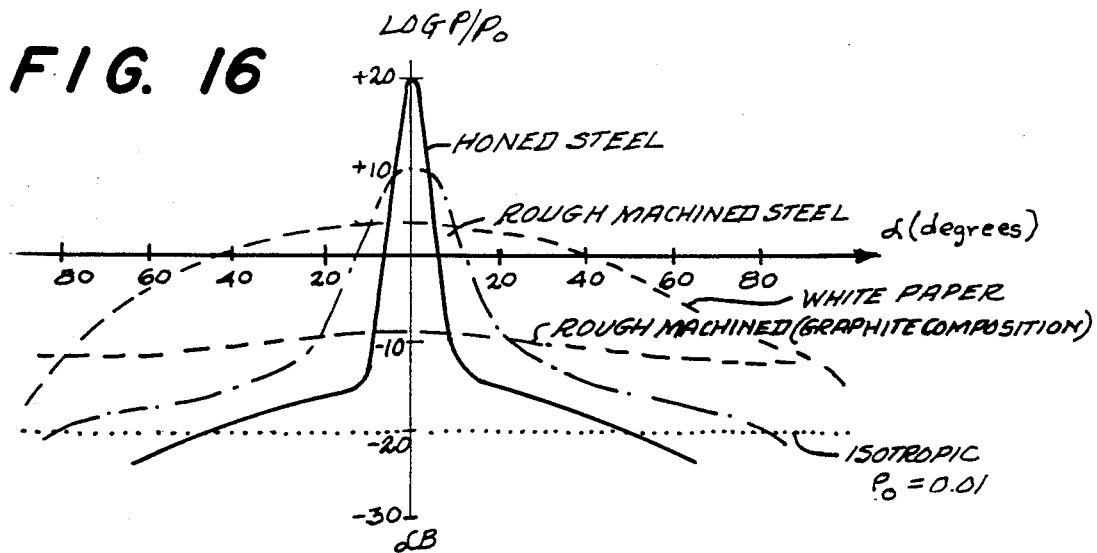
FIG. 16
FIG. 17 (PRIOR ART)
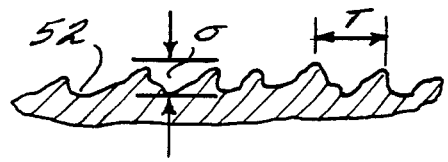
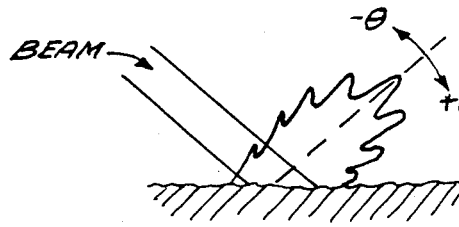
FIG. 18(A)
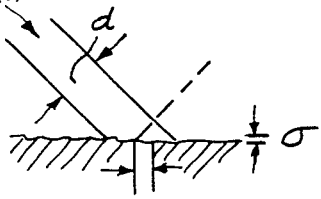
FIG. 18(B)
FIG. 19
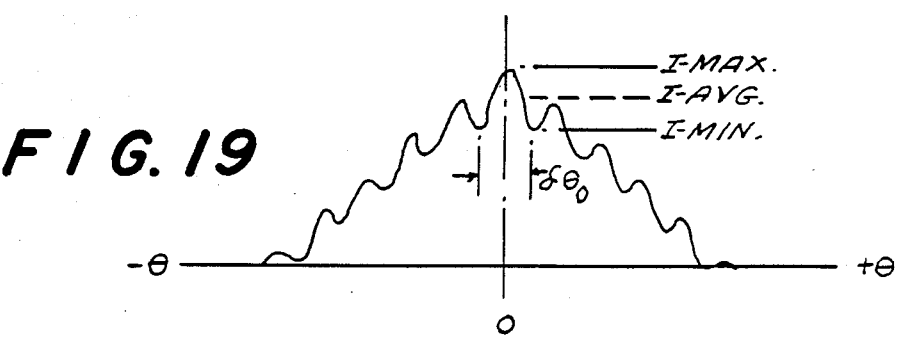

FREQUENCY MODULATED LASAR RADAR

FIELD OF THE INVENTION

The invention is related to optical devices for measuring distance. In particular, the invention is related to radar devices utilizing a frequency modulated beam of coherent radiation for measuring the distance to an arbitrary target and is especially related to such devices used for precision gauging applications.

BACKGROUND OF THE INVENTION

Radar determines the distance to an object by directing electromagnetic energy at the object and detecting the presence and character of the energy reflected by the object. The radar principle has been applied from frequencies of a few megahertz to the ultraviolet (laser radar). Since good angular resolution and range resolution are obtainable with radars utilizing coherent radiation, laser radars are useful for target information-gathering applications such as ranging and imaging.

One common use of laser distance measuring devices is in the field of non-contact precision gauging. Devices utilizing a beam of coherent radiation to determine the contour of a target are known. For instance, U.S. Pat. Nos. 3,589,815 and 3,692,414 to Hosterman (issued June 29, 1971 and Sept. 19, 1972, respectively) disclose a non-contacting measuring probe which directs a beam of coherent radiation onto the surface of an arbitrary object. The focal property of a lens is used to determine the distance of the object from the lens. Somewhat similar schemes are disclosed in U.S. Pat. Nos. 3,909,131 to Waters (issued Sept. 30, 1975), 3,986,774 to Lowrey, Jr. et al (issued Oct. 19, 1976), 4,299,291 to Waters et al (issued Nov. 10, 1981) and 4,209,253 to Hughes (issued June 24, 1980). These schemes all have the disadvantage that separate transmitters and receivers must be used, and that the accuracy of the obtained measurements depends upon the mechanical movement of the reflector or a detector.

Interferometry, of course, provides highly accurate measurements of distances from a coherent radiation source to a cooperative reflector. Optical interferometers are well known as tools for metrology and spectroscopy. Measurements of very small distances and thicknesses to a high degree of accuracy may be obtained. See, for example, U.S. Pat. Nos. 4,290,697 to McLandrich (issued Sept. 22, 1981), 4,325,636 to Schiffner (issued Apr. 20, 1982), and 4,329,056 to Lachombat et al (issued May 11, 1982), all of which disclose interferometer devices utilizing an optical path defined by a fiber optic coil. However, interferometry has not been applied to gauging of distances to an arbitrary object (such as a diffuse scattering surface) because the signal-to-noise ratio produced is so low as to pose a major obstacle. See, e.g., U.S. Pat. No. 3,909,131 to Waters, col. 1, lines 29–35.

Nussmeier has developed a self-calibrating interferometer apparatus and method which permits distance measurements to a retro-reflector. This interferometer is disclosed in U.S. Pat. Nos. 4,355,899 and 4,355,900 (both issued Oct. 26, 1982), INTERFEROMETRIC TECHNIQUE FOR MEASURING DISTANCE AT OPTICAL FREQUENCIES (Abstract of Naval Technology from the Air Force Systems Command dated Mar. 28, 1977) and SELF-CALIBRATING INTERFEROMETER FOR OPTICAL PHASE MEASUREMENT (Abstract of New Technology from the Air Force Systems Command, dated Mar. 10, 1977).

Nussmeier's invention permits calculation of an unknown multi-wavelength distance by measuring the differential phase shift between two paths (a known reference path and the unknown path the distance of which is to be measured) at each of several wavelengths. The ambiguity inherent in the measurement of the single wavelength is resolved by combination of the multi-wavelength measurements. A single phase shifter is incorporated within the interferometer. An electromagnetic beam of radiation (preferably a laser beam) is expanded to fill a beam splitter, which divides the beam into a pair of beams (a local beam and a remote beam). The local beam illuminates a reflecting element mounted on the phase shifter. The reflecting element divides the local beam into two portions separated by a slight angle. These two portions of the local beam are reflected back through the beam splitter to a pair of detectors, one for each of the spatially separated portions of the local beam.

The remote beam is also split into two portions by a reference flat which intercepts the remote beam. The reference flat is optically aligned with the remote beam so as to reflect a portion of the remote beam back to the beam splitter (and from there to the first of the detectors). The portion of the local beam reflected from the phase shifter and the portion of the remote beam reflected from the reference flat form interference fringes on the first detector, thereby causing intensity variations as a function of the differential path length.

The remaining portion of the remote beam passes by the reference flat and illuminates the retro-reflector located on the target (which is positioned an unknown distance away from the interferometer). The retro-reflector reflects that portion of the remote beam impinging thereupon back to the beam splitter. The beam splitter directs the reflected remote beam to the second detector, where it interferes with the portion of the local beam impinging upon the second detector and likewise creates interference fringes and associated intensity variations. The transfer function measured from the phase shifter to either detector is sinusoidal with a full cycle for each halfwavelength of phase shifter travel. The phase difference between the two sinusoidal detector outputs represents the optical phase difference between the reference and signal portions (paths) of the remote beam of the interferometer.

In other words, the interferometer in accordance with Nussmeier's invention can be characterized as two Michelson interferometers, one beam length of each of which is controlled by the common phase shifter. The phase shifter disclosed comprises a reflecting element mounted on a conventional translational device (such as piezoelectric element).

SUMMARY OF THE INVENTION

The present invention is an apparatus and a method for measuring the distance to an arbitrary target. A radiation source produces a continuous beam of coherent radiation. The frequency of the radiation is continuously varied. The beam is divided into a ranging beam and a reference beam. The ranging beam is coupled to a ranging interferometer, which directs a portion of the ranging beam at the target. The ranging interferometer produces a first signal indicative of the phase difference between a portion of the ranging beam directed at and reflected by the target and another portion of the ranging beam which has travelled over a path of a fixed length. The reference beam is coupled to a reference interferometer. A portion of the reference beam is directed by the reference interferometer along a reference path of a predetermined length, and the phase difference between the portion of the reference beam directed along the reference path and another portion of the reference beam which has travelled over a path of a fixed length is measured. The phase difference between the two portions of the reference beam and the phase difference between the two portions of the ranging beam are processed to determine the distance of the target from the ranging interferometer.

The ranging interferometer may include a beam splitter directing a first portion of the ranging beam along a first path of the first predetermined distance and directing a second portion of the ranging beam along a second path comprising the round-trip path to the target and the first path. Likewise, the reference interferometer may comprise a beam splitter directing a first portion of a reference beam along a third path of a second predetermined length and directing a second portion of the reference beam along a fourth (reference) path comprising a third predetermined length and the third path. The reference path may comprise an optical fiber.

The ranging interferometer may focus the ranging beam onto the target. The ranging interferometer may also include a phase difference determining device optically coupled to the ranging interferometer beam splitter which produces a signal indicative of the phase difference between the first portion of the ranging beam after traveling over the first path and the second portion of the ranging beam after traveling over the second path. Likewise, the reference interferometer may include a phase difference determining device optically coupled to the reference interferometer beam splitter which produces a signal indicative of the phase difference between the first portion of the reference beam after traveling over the third path and a second portion of the reference beam after traveling over the fourth path.

The frequency of the radiation may be swept between a first and a second frequency. Such sweeps may be periodically performed (as in a sawtooth waveform), and may be accomplished mechanically or electrically. The ranging interferometer phase difference determining device may, for each sweep of the frequency of the radiation source, count the number of fringes Nr resulting from the wave interference between the first portion of the ranging beam after traveling over the first path and a second portion of the ranging beam after traveling over the second path. The reference interferometer phase difference determining device may, for each sweep of the frequency of the radiation source, count the number of fringes Nref resulting from the wave interference between the first portion of the reference beam after traveling over the third path and a second portion of the reference beam after traveling over the fourth path. A processing device may determine the distance of the target from the ranging interferometer by dividing Nr by Nref and multiplying the quotient by the third predetermined length (the length of the reference path).

The surface roughness of the surface of a target may also be ascertained in accordance with the present invention. The continuous beam of coherent radiation is directed on the surface, and the angle of incidence of the beam on the surface is varied. The intensity of the radiation scattered by the surface is measured for a plurality of angles of incidence. These measured intensities are processed to produce indicia of surface roughness.

Measured intensities may be stored for a plurality of angles of incidence. The stored measured intensities may then be compared with stored experimentally-obtained data comprising intensities of scattered radiation as a function of angle of incidence for a plurality of predetermined surfaces in order to characterize the roughness of the measured surface.

Surface roughness in accordance with the present invention may also be ascertained by characterizing modulations in the intensity of the scattered radiation produced by interference between portions of the radiation reflected by different points on the target. The intensity of the modulations may be characterized according to peak-to-peak amplitude and angular displacement. The peak-to-peak amplitudes and angular displacements of the modulations may be determined by changing the frequency of the radiation, the angle of incidence of the radiation, or by scanning the beam over the surface. The peak-to-peak amplitudes and angular displacements of the surface may be compared with stored experimentally-obtained data for a plurality of different predetermined surfaces in order to characterize the surface.

Nussmeier's interferometer (discussed previously) avoids range ambiguity by using two closely spaced laser frequencies. Equation (13) shown at column 4, line 59 of U.S. Pat. No. 4,355,899 relates the range $L_u$ to the difference between the two laser frequencies as follows:

$$2L_u = \frac{c}{f_1 - f_2}$$

(where c is the velocity of light).

For a typical case where $L_u$ is approximately equal to one meter, $f_1-f_2$ must thus be made approximately equal to 150 megahertz.

The range precision of Nussmeier's o invention depends upon the optical phase null $\delta\phi$ which can be achieved:

$$\Delta L_u = \frac{c}{4(f_2 - f_1)} \frac{\delta\phi}{2\pi}$$

Note that $$\frac{c}{4(f_2 - f_1)}$$

typically would be very large and would include thousands of fringes of light. To reduce the ambiguity $\Delta L_u$ to one interference fringe (i.e. $\Delta L_u \leq \lambda/2$), $\delta\phi$ must be made less than or equal to $5 \times 10^{-6}$ radians. This figure probably can not be achieved in practice.

The uncertainty in range may also be written in terms of the signal-to-noise ratio as:

$$\Delta L_u = \frac{c}{4\Delta f} \cdot \frac{1}{\sqrt{S/N}}$$

For Nussmeier's invention to achieve a small range uncertainty, sources which are extremely stable in frequency (on the order of one part in $10^{10}$) must be used, and a cooperative reflector must be located on the target to reflect back radiation of sufficient intensity.

In accordance with the present invention, the range uncertainty is written as:

$$\Delta R = \frac{c}{4\Delta f}$$

(where $\Delta f$ is the frequency deviation of the sweep of the Fm laser source). In accordance with the present invention, very small range uncertainties are obtained in the determination of the range to an arbitrary target while only practically obtainable signal-to-noise ratio figures are necessary. Additionally, the present invention requires only that the sweep in frequency of the FM laser source be continuous; neither the absolute frequency nor the stability of the source, nor the actual amount of frequency deviation is critical to accuracy.

The radar device and method in accordance with the present invention measures *absolute* distance rather than *changes* in distance (unlike conventional interferometers). A system in accordance with the present invention can perform absolute distance measurements off of an arbitrary surface (including a diffuse surface). The present invention is a true radar rather than merely an interferometer in that the target need not be a cooperative reflector. An accuracy approaching the wavelength of laser light (33 millionths of an inch) is obtainable. Recent improvements in the quality of injection laser diodes provide the coherence length and wavelength tuning range needed. Small size of the invention (made possible by high technology integrated optical assemblies) make possible the development of low cost, precise measuring sensors in accordance with the present invention which are orders of magnitude more accurate and more reliable and their conventional counterparts. Processing of the measuring results is relatively simple and the degree of resolution is vastly improved over conventional devices because the number of fringes are counted (thus permitting the use of digital signal processing circuits). Moreover, the present invention is "self-calibrating" in that the beam path may be momentarily interrupted without affecting the measurement.

The potential applications of the present invention are practically limitless. Anticipated immediate large volume applications include non-contact precision gauging, mapping of contoured surfaces, large structure metering, surface quality measurement, secondary standard calibration, inspection of finished parts, positioning of robot arms, and proximity sensors in the fingertips of robot grippers. Because of the inherent versatility of the present invention, the list of potential applications appears virtually endless.

BRIEF DESCRIPTION OF THE DRAWINGS

These and other features and advantages of the invention can be more easily understood from the following more detailed description taken in conjunction with the accompanying figures in which:

FIG. 5 is a schematic block diagram of a third presently preferred embodiment of the present invention using Michelson interferometers implemented in conventional optics;

FIG. 6 is a schematic block diagram of a fourth presently preferred embodiment of the present invention using Mach-Zehnder interferometers implemented with conventional optics;

FIG. 7 is a side elevational view of a bimorph element of a first embodiment of the FM Driver Block and laser source shown in FIG. 8;

FIG. 8 is a schematic diagram of a first embodiment of the Laser Source and FM Driver Block of the embodiment shown in FIG. 2(A);

FIG. 9 is a schematic diagram of a second embodiment of the Laser Source and FM Driver Blocks of the embodiment shown in FIG. 2(A);

FIG. 10 is a schematic diagram of a third embodiment of the Laser Source and FM Driver Blocks of the embodiment shown in FIG. 2(A);

FIG. 11 is a graphical illustration of the near field effects associated with a conventional FM radar utilizing an afocal antenna;

FIG. 12 is a graphical illustration of the near field effects associated with the embodiment of the present invention shown in FIG. 2(A);

FIG. 13 is a graphical illustration of the precision achievable for multiple FM sweeps of the laser source in accordance with the present invention as a function of integration time of each measurement;

FIG. 16 is a schematic illustration of experimental results of surface reflectivity profiles as a function of tilt angle for several different typical surfaces;

FIG. 17 is a graphical illustration of surface roughness parameters;

FIGS. 18(A) and 18(B) are graphical illustrations of speckle pattern parameters in accordance with the present invention; and FIG. 19 is a graphical illustration of a representative speckle pattern in accordance with the present invention for an arbitrary surface.

DETAILED DESCRIPTION OF THE PREFERRED EMBODIMENTS

Figure 1:
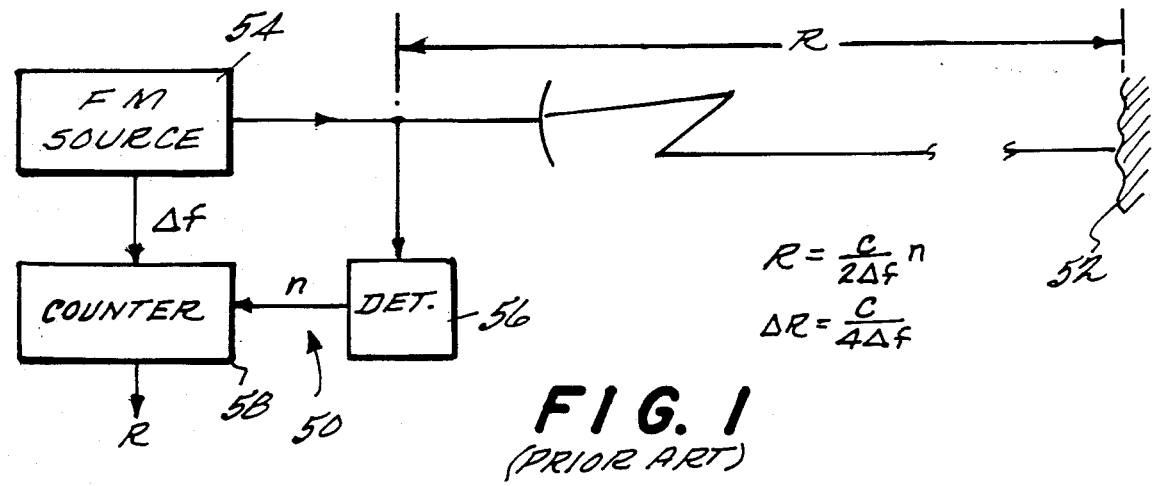
FIG. 1 is a schematic block diagram of a conventional radar system.

FIG. 1 is a schematic block diagram of a conventional FM CW radar system 50. The distance R to an arbitrary target 52 is to be measured. FM Source 54 produces a continuous beam of frequency modulated rf radiation which is directed toward target 52. The radiation reflected by target 52 is detected by a detector 56. A counter 58 measures the interference beats (heterodyne frequency) between the transmitted signal and the received signal as the transmitter frequency is frequency modulated with a frequency deviation of delta f ($\Delta f$). Distance R may be calculated as $$R = \frac{c}{2\Delta f} \cdot n \qquad (1)$$

(where c is the speed of light, $\Delta f$ is the frequency deviation, and n is the number of interference beats between the transmitted and the received signals).

The accuracy of the measurement of system 50 is dependent upon the frequency deviation $\Delta f$ of the FM Source, and is given by $$\Delta R = \frac{c}{4\Delta f} \qquad (2)$$

Of course, at conventional microwave frequencies, $\Delta f$ may be made relatively large to obtain a desired accuracy. Some of the operating fundamentals of the system shown in FIG. 1 are adaptable to the present invention, as will be seen shortly.

Figure 2A:
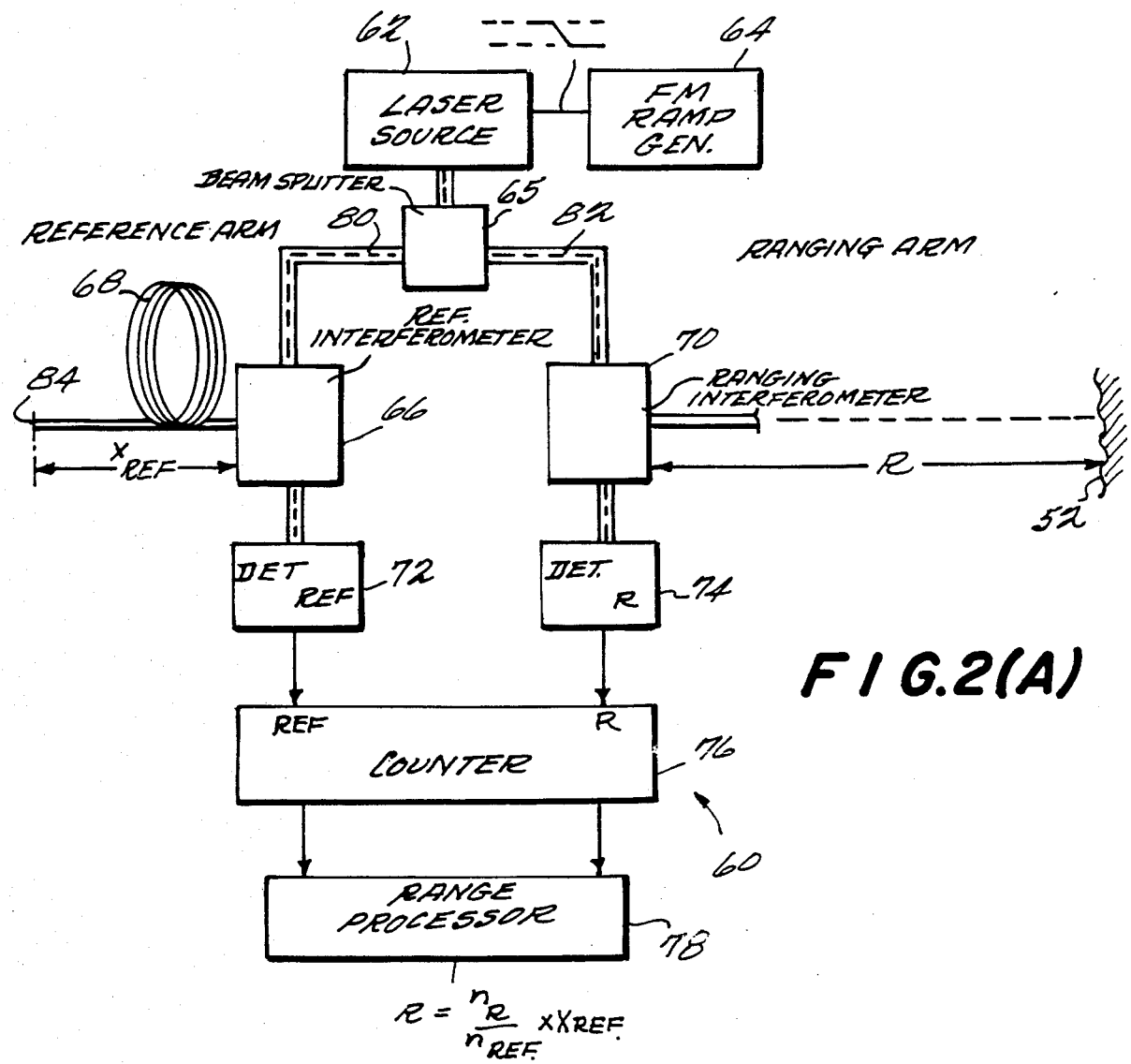
FIG. 2(A) is a high-level schematic block diagram of a first presently preferred exemplary embodiment of the present invention.

FIG. 2(A) shows a schematic block diagram of a first presently preferred embodiment of a system 60 in accordance with the present invention. System 60 mainly comprises a laser source 62 and an associated FM ramp generator 64, a beam splitter 65, a reference interferometer 66 and an associated reference arm 68, a ranging interferometer 70, a reference phase difference detector 72, a ranging phase difference detector 74, a counter 76, and a range processor 78. System 60 measures the distance (range) R from ranging interferometer 70 to an arbitrary target 52. Target 52 may be a diffuse surface which reflects and/or scatters (diffusely reflects) light incident to it.

Coherent radiation is produced by laser source 62. FM ramp generator 64 frequency modulates the coherent radiation produced by the laser source 62. In the preferred embodiment, ramp generator 64 produces a periodic waveform (such as a sawtooth) which is continuous and increasing (or decreasing) between first and second levels. This periodic waveform is used to sweep the frequency of the radiation produced by laser source 62 between a first and a second frequency (the sweep being continuous and constantly increasing or decreasing between the first and the second frequencies).

The coherent radiation produced by laser source 62 is coupled to beam splitter 65, which divides the radiation into a reference beam 80 and a ranging beam 82. Beam splitter 65 may comprise any conventional optical beam splitter, as will be discussed in greater detail shortly. Reference beam 80 is coupled to reference interferometer 66, while ranging beam 82 is coupled to ranging interferometer 70. Reference and ranging interferometer 66 and 70 may comprise conventional interferometers, as will be discussed shortly.

As is well known, a conventional interferometer produces a wave interference pattern between light which has traveled along a first path and light which has traveled along a second path. Typically, the first path is of a known, predetermined length while the second path is of an unknown length and includes the first path and a path the length of which is to be determined. By measuring the difference in phase between the light which has traveled along the first path and the light which has traveled along the second path, it is possible to ascertain the difference in path lengths of the first and second paths. As is also well known, however, a single interferometer only resolves the difference in path lengths to within a fraction of the wavelength of the light $\Delta\lambda$, without resolving the number of wavelengths by which these two paths differ. In other words, a single interferometer will measure the same phase difference whether the lengths of the two paths differ by $\Delta\lambda+\lambda$, $\Delta\lambda+2\cdot\lambda$. . . , $\Delta\lambda+n\cdot\lambda$ (where n is an integer and $\lambda$ is the wavelength of the light). Additional information must be obtained to resolve this range ambiguity. Various techniques have been proposed in the past to solve this problem. See, e.g., U.S. Pat. No. 4,355,899 to Nussmeier (discussed previously) for one such proposed solution.

To eliminate this ambiguity, reference interferometer 66 of the present invention includes a path of fixed length (internal to the interferometer and thus not shown) and a second (reference) path 68. In accordance with the present invention, path 68 is of a known predetermined length (its length being very accurately measured, preferably by calibrating system 60 with a primary standard). Reference interferometer 66 splits reference beam 80 into two portions, and directs one portion along path 68 and another portion along the fixed internal path. In the preferred embodiment, path 68 includes a reflector 84 to reflect the portion of reference beam 80 directed along path 68 back to reference interferometer 66. Reference interferometer 66 produces a wave interference pattern between the portion of the reference beam 80 directed along path 68 and the portion of the reference beam directed along the fixed internal path. As the frequency of the laser source 62 is swept, the wave interference pattern will comprise a plurality of fringes. Reference detector 72 detects the fringes in the wave interference pattern.

Ranging beam 82 is likewise directed to ranging interferometer 70, which splits the ranging beam into two beams. The first beam is directed at target 52, which reflects (scatters) some of the beam back toward interferometer 70. The second beam travels along a path of fixed length internal to ranging interferometer 70. The beam reflected (scattered) by target 52 and the beam which has traveled along the path internal to ranging interferometer 70 interfere with one another, producing a fringe pattern. Ranging detector 74 detects the fringes in the wave interference pattern.

Figure 2B:
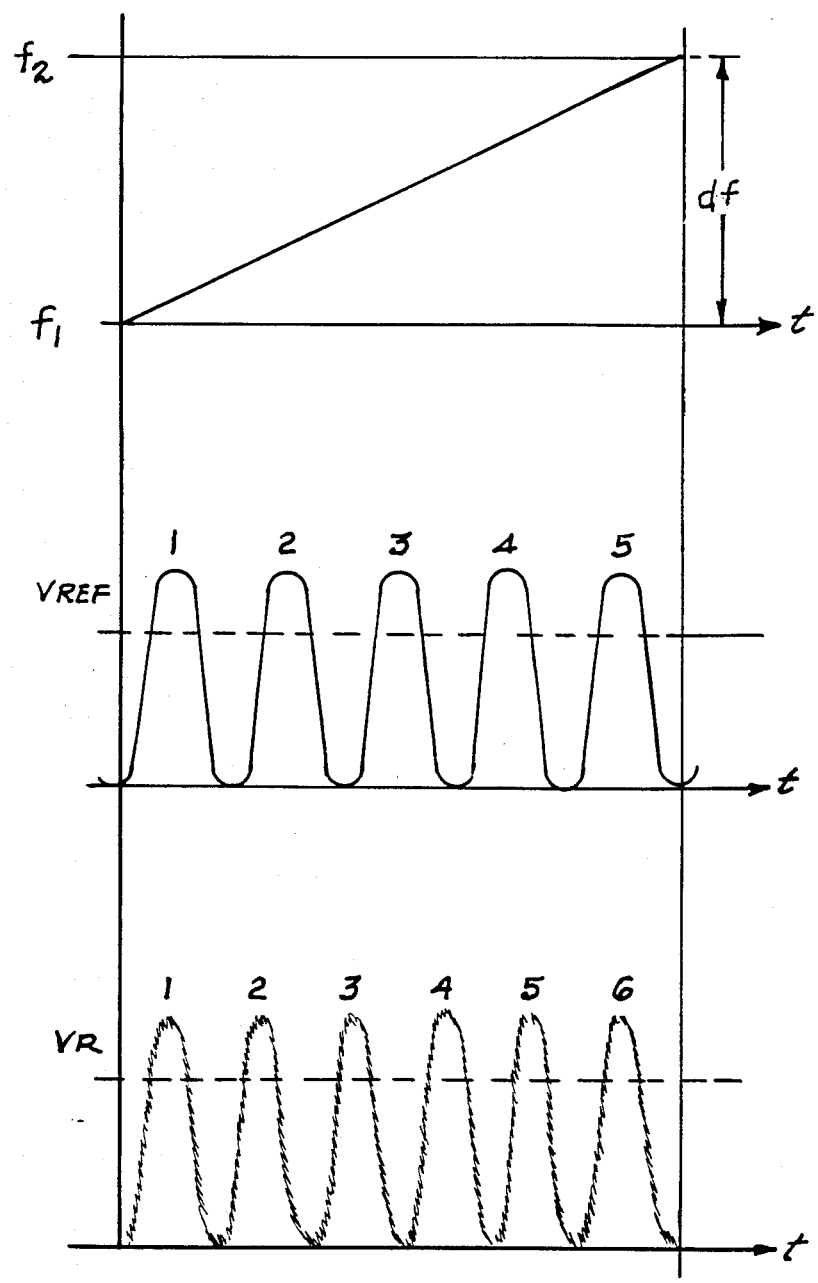
FIG. 2(B) is a graphical illustration of the outputs of detectors 72 and 74 of the embodiment shown in FIG. 2(A) as a function of a sweep df in frequency of laser source 62.

FIG. 2(B) shows typical outputs of detectors 72 and 74 for an incremental change df in frequency of the radiation produced by laser source 62 (note that df shown is much smaller than the frequency deviation actually used in the present invention). The respective outputs of reference detector 72 and ranging detector 74 are input to counter 76, which separately counts the number of fringes in the wave interference pattern of the reference and ranging interferometers (66 and 70) for each sweep of frequency deviation $\Delta f$ of FM driver 64. $N_{ref}$ is the number of fringes in the wave interference pattern of the reference interferometer 66 for the sweep, while $N_r$ is the number of fringes in the wave interference pattern of the ranging interferometer 70 for the sweep. FIG. 2(B) shows, for example, 5 fringe counts output by detector 72 and 6 fringe counts output by detector 74 for a frequency sweep of df. Processor 78 calculates R (range) for each sweep of Δf according to the following equation:

$$R = \frac{N_R}{N_{ref}} \cdot X_{ref} \quad (3)$$

Provided that $X_{ref}$ is precisely known, the measurement of R will be highly accurate.

As is well known, accurate measurement of the absolute frequency of a beam of light is very difficult. Likewise, the accurate analog measurement of the phase difference between two beams of light is difficult or impossible to achieve because of the very high frequency of light. The present invention requires the measurement of neither the absolute frequency of light nor the analog phase difference between two beams of light. Rather, the present invention measures phase difference only in modulo of $2\pi$ (i.e., the number of fringes are counted and phase difference less than one fringe is ignored). In accordance with the present invention, counter 76 and processor 78 may both be digital, resulting in a far simpler and more accurate approach. Though inaccuracy is produced by the failure to resolve phase difference to within less than $2\pi$ radians, the effect of this inaccuracy can be reduced so as to be negligible and highly accurate measurements may thus be obtained (as will be explained). Range uncertainty of the system 60 in accordance with the present invention will be discussed in greater detail shortly.

Figure 4:
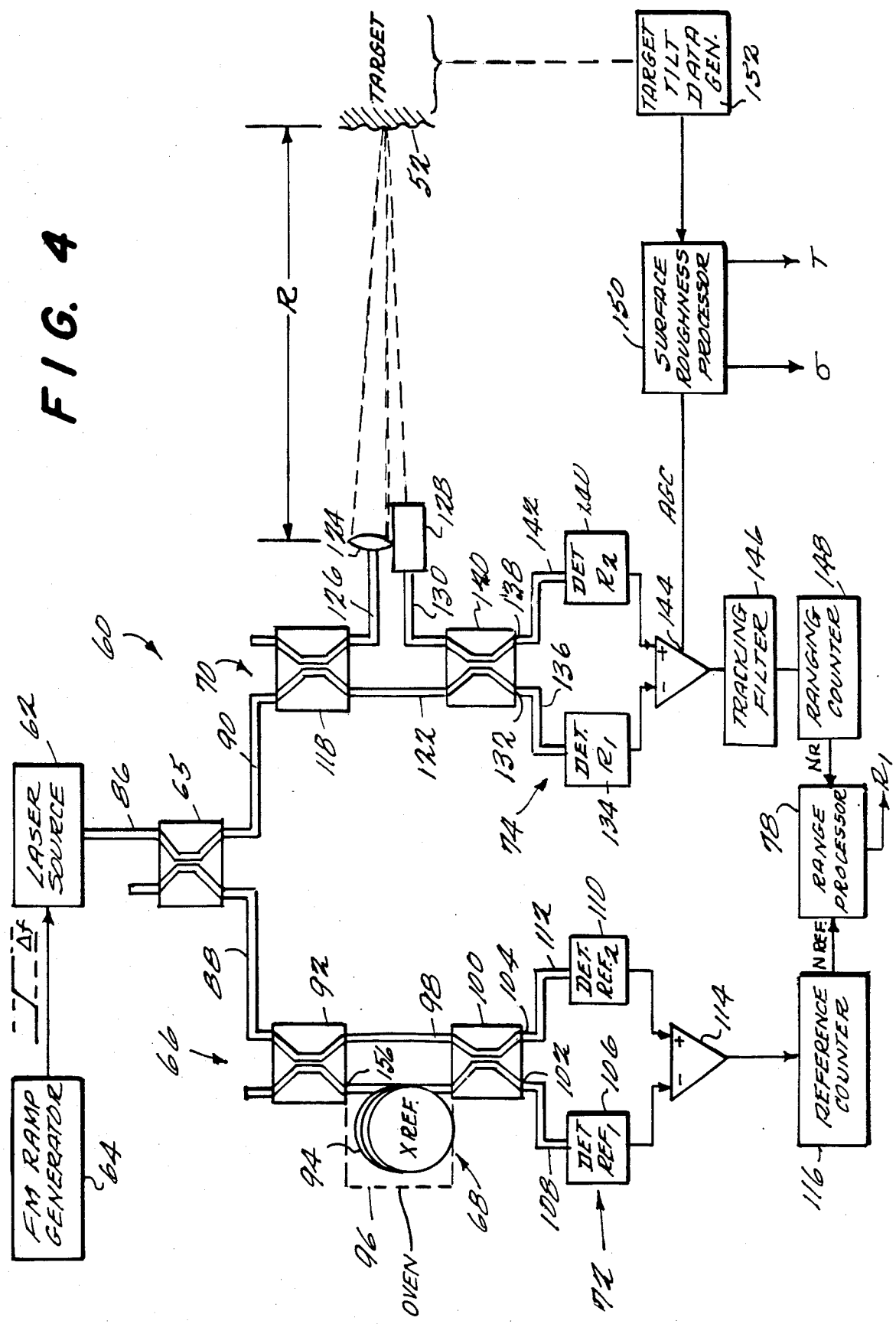
FIG. 4 is a detailed schematic block diagram of a second presently preferred exemplary embodiment of the present invention using Mach-Zehnder interferometers in lieu of the Michelson interferometers shown in FIG. 3.

FIG. 4 shows a detailed schematic block diagram of a second presently preferred exemplary embodiment of the present invention. The embodiment shown in FIG. 4 is implemented using fiber optic technology. Laser source 62 directs a frequency modulated beam of coherent radiation to beam splitter 65 through optical fiber 86. Beam splitter 65 comprises a conventional star coupler, and splits the beam into a reference beam (coupled into optical fiber 88) and a ranging beam (coupled into optical fiber 90). As is well known, conventional star couplers ("star-configured data buses") may be used as passive mixing elements, i.e., the optical powers from the input ports of the star coupler are mixed together and then divided equally among the output ports. Such conventional star couplers may be used to combine signals or to split a signal into parts.

The reference beam is coupled to a star coupler 92, which splits the beam into first and second beams. The first beam is coupled through a reference arm 68 comprising a coiled length of optical fiber 94. Optical fiber 94 may be housed in a conventional temperature-controlled oven 96. The function of oven 96 is to maintain the length ($X_{ref}$) of optical fiber 94 constant. The second beam derived from the reference beam by star coupler 92 is coupled through an optical fiber 98. The beams traveling through optical fibers 94 and 98 are both coupled to a star coupler 100, which produces wave interference between the two beams.

The length of optical fiber 94 should be approximately equal to the range R to be measured for greatest accuracy. When $X_{ref}$ differs from R by a factor of 3, accuracy is still relatively good, although accuracy does decrease appreciably when $X_{ref}$ differs from R by a factor of 10 or more.

Star coupler 100 produces two outputs, one on an output port 102 and one on an output port 104. The output produced at output port 102 is of equal amplitude and opposite polarity to the output produced at output port 104 (for instance, output port 102 would produce a light fringe where output port 104 would produce a dark fringe). Output port 102 is coupled to a first reference detector 106 through an optical fiber 108, while output port 104 is coupled to second reference detector 110 through an optical fiber 112. Reference detectors 106 and 100 produce complementary outputs indicative of the number of fringes in the wave interference pattern (see FIG. 2(B)).

The output of detector 106 is applied to one input of a differential operational amplifier 114, while the output of detector 110 is applied to the other input of the operational amplifier. Operational amplifier 114 subtracts the output of detector 106 from the output of detector 110, which, in effect, sums the amplitudes of the desired signals indicating the detected wave interference pattern. However, the effect of laser noise (such as jitter) is substantially decreased by employing this arrangement, since much of the noise present at the outputs of detectors 106 and 110 will be cancelled out by the subtraction process performed by operational amplifier 114 and thus will not be present on the output of the operational amplifier. This technique of using detectors producing complementary outputs and a differential amplifier to reduce effects of noise is described in Biancomano, V., "Special Report on Fiber Optic Components", *Electronic Design News*, pages 108–110 (Mar. 8, 1984); see also Skolnick, Merrill, *Radar Handbook*, page 5-9 (McGraw-Hill, 1970).

A reference counter 116 counts the number of fringes of the wave interference pattern by counting the number of pulses present at the output of operational amplifier 118 as FM ramp generator 64 sweeps through Δf in frequency. Operational amplifier 114 typically is operated in a saturated mode, so that it will produce a logic 1 output whenever the difference signal increases above a predetermined threshold.

Optical fiber 90 (through which travels the ranging beam) is coupled to a star coupler 118 which splits the ranging beam into a first and a second beam. The first beam is coupled to a star coupler 120 by an optical fiber 122 of a predetermined fixed length. The second beam is coupled to a conventional lens 124 through an optical fiber 126. Lens 124 focuses the second beam onto target 52. Obviously, since R is not predetermined, the focal point of lens 124 will not be exactly located at target 52. Depth of range due to this inherent approximation of the focal point will be discussed in greater detail in conjunction with FIGS. 12 and 14. A portion of the second beam is reflected by target 52 back toward a collimator 128, which is coupled to star coupler 120 through an optical fiber 130. A first output port 132 of star coupler 120 is coupled to a first ranging detector 134 (via an optical fiber 136), while a second output port 138 of the star coupler is coupled to a second ranging detector 140 (via an optical fiber 142).

The respective outputs of ranging detectors 134 and 140 are connected to respective inputs of a differential operational amplifier 144, which functions in a manner similar to that of operational amplifier 114. The output of operational amplifier 144 is applied to the input of a narrow passband tracking filter 146. The function of tracking filter 146 is to lock its narrow passband to the fringe rate frequency to pass only fringe count information while rejecting noise outside of the narrow passband. The output of tracking filter 4 is applied to the input of a ranging counter 148 which counts the number of pulses produced at the output of operational amplifier 144 (and passed by tracking filter 146).

While a tracking filter could be included between the output of operational amplifier 114 and the input of reference counter 116, one is ordinarily not necessary because of the relatively strong beam intensities present in reference interferometer 66. However, because the intensity of the beam reflected by target 52 may be relatively weak, significant amount of noise may be present on the signal (as shown in FIG. 2(B)). Tracking filter 146 significantly improves the signal-to-noise ratio of system 60, thus improving circuit performance, reducing errors, and increasing measurement accuracy (as will be explained).

Reference counter 116 produces an output $N_{ref}$, the number of fringes in the wave interference pattern of the reference interferometer 66 for a given frequency sweep ($\Delta f$) of FM ramp generator 64. Ranging counter 148 produces an output $N_r$, the number of fringes in the wave interference pattern of the ranging interferometer 74 for a given frequency sweep ($\Delta f$). $N_{ref}$ and $N_r$ are both applied to a range processor 78, which produces an output R in accordance with equation 3 above.

Operational amplifier 144 additionally produces an AGC output which is proportional to the amplitude of the wave interference pattern of ranging interferometer 74 (and thus to the intensity of the beam reflected by target 52). The AGC output is applied to the input of a surface roughness processor 150. A second input of surface roughness processor 150 is connected to a target tilt data generator block 152 which provides instantaneous data specifying the angle of incidence of the beam directed at target 52 by collimator 124. Surface roughness processor 150 produces two surface roughness parameters ($\sigma$, T) which are indicia of the roughness of the surface of target 52 reflecting (scattering) light back toward collimator 128. The function of surface roughness processor 150 and target tilt generator 152 will be described in greater detail in conjunction with FIGS. 15(A)–19.

Figure 3:
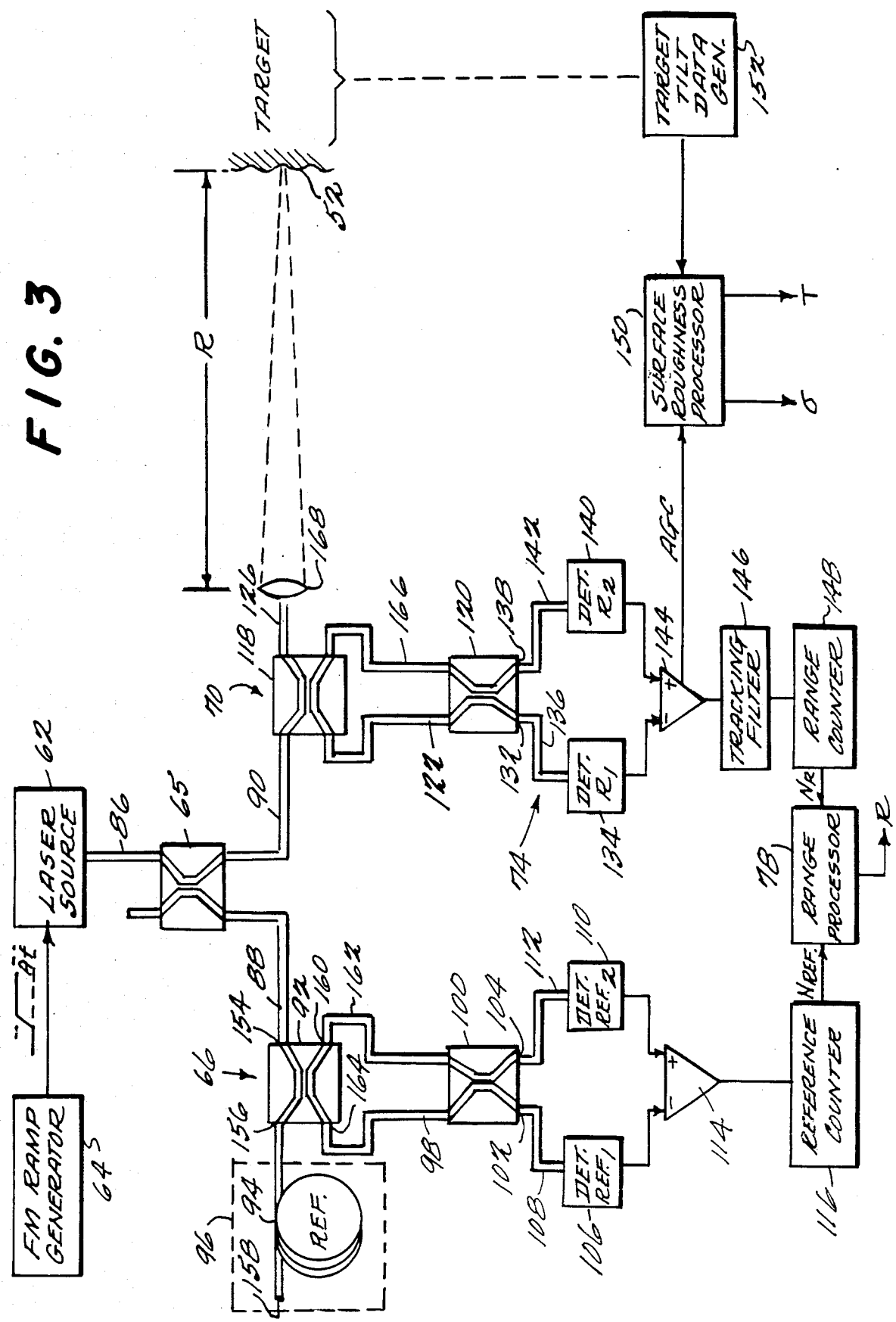
FIG. 3 is a detailed schematic block diagram of the embodiment shown in FIG. 2(A)

It will be understood by those skilled in the art that interferometers 66 and 70 of the embodiment shown in FIG. 4 each comprise a conventional Mach-Zehnder type interferometer (thus, the embodiment of FIG. 4 is a "bi-static" radar). FIG. 3 shows another embodiment in accordance with the present invention wherein interferometers 66 and 70 are Michelson interferometers rather than Mach-Zehnder interferometers (i.e. a "mono-static" radar). FIG. 3 is a detailed diagram of the embodiment shown in FIG. 2(A). As can be seen, optical fiber 88 is coupled to an input port 154 of star coupler 92, while the corresponding (opposite) output port 156 of the star coupler is coupled to optical fiber 94. However, the other end of optical fiber 94 terminates with a specular surface 158 which serves to reflect light back toward star coupler 92. A second input port 160 of star coupler 92 is connected to star coupler 100 via an optical fiber 162, while a second output port 164 of star coupler 92 is coupled to star coupler 100 via optical fiber 98. Star couplers 92 and 100, together with optical fibers 98 and 162, form a Michelson interferometer. It will be noted that the path length $X_{ref}$ of the portion of the reference beam traveling through optical fiber 94 will now be twice the length of the optical fiber because the light must travel the entire length of the optical fiber, strike specular surface 158, and be reflected back toward star coupler 92.

Star couplers 118 and 120 (together with optical fibers 122 and 166) are arranged in a manner similar to star couplers 66 and 100 (and optical fibers 98 and 162) so that ranging interferometer 70 also comprises a Michelson interferometer. Only a single lens 168 is coupled to star coupler 118. Lens 168 is used both to transmit a portion of the ranging beam toward target 52 and to receive the portion of the beam reflected by the target.

Slight decreases in efficiency result in the use of Michelson interferometers in lieu of the Mach-Zehnder interferometers of FIG. 3 (a 3 dB decrease in efficiency is predicted). However, since only one lens 168 is employed for both transmission and reception, the embodiment shown in FIG. 4 may be preferred for some applications.

FIG. 5 shows a third embodiment of the present invention implemented with partially reflective plates, mirrors and free space (beam optics) paths in lieu of star couplers and optical fibers. The embodiment shown in FIG. 5 is analogous to the embodiment shown in FIG. 3 in that dual Michelson interferometers are used. Partially reflective, partially transmissive plates 166 and 468 divide the beam produced by laser source 62 into a target beam and a reference beam, and divide the target and the reference beam each into two portions. Mirrors 170 and 172 reflect beams directed at them by one of partially reflective plates 166 and 468 to the other one of the partially reflective plates. Detectors 72 and 74 respectively produce signals indicative of the number of fringes in the reference and the ranging interferometers. Counter 76 and processor 78 function as previously described.

Shown in FIG. 6 is a free space (beam optics) equivalent of the embodiment shown in FIG. 4 in that dual Mach-Zehnder interferometers are employed. Note that plates 174 and 176 are both partially reflective and partially transmissive.

A serious disadvantage of the embodiments of the invention FIGS. 5 and 6 is that the reference arm must occupy free space, thus substantially increasing the size of the apparatus if distances R to be measured are relatively long. The reference path of the embodiments shown in FIGS. 3 and 4 is defined by a coiled optical fiber; thus, the $X_{ref}$ may be relatively long and yet the coiled optical fiber which defines that path can be made to occupy a relatively small volume.

As has been mentioned, the beam produced by laser source 62 is frequency modulated by FM ramp generator 64. Ramp generator 64 produces an output which is continuous and, in the preferred embodiment, is periodic. Only one frequency sweep ($\Delta f$) is required to make a measurement of R in accordance with the present invention. However, it is typically desirable to measure R several times and then perform independent statistical analysis (to be discussed shortly) in order to achieve greater measurement precision. For this reason, ramp generator 64 in the preferred embodiment generates a periodic symmetrically sawtooth waveform (although any continuous waveform could be used).

It is critical to accuracy that the frequency deviation of the beam produced by laser source 62 be great enough. As will be explained shortly, the accuracy achievable by the present invention is directly related to the frequency deviation. One embodiment of a laser source 62 in accordance with the present invention is shown in FIG. 8. The embodiment of laser source 62 shown in FIG. 8 comprises a solid state injection laser diode 178, a collimating lens 180, a blazed grating 182, a piezoeletric bender bimorph 184 and a half reflecting plate 186. Diode 178, lens 180, grating 182, bimorph 184 and half reflecting plate 186 are mounted inside of a resonant laser cavity 189. A current i is applied to diode 178, causing it to produce radiation. Some of the radiation produced by diode 178 is directed toward collimating lens 180, which parallelly aligns the radiation and directs it toward grating 182.

As is well known, blazed grating 182 reflects radiation incident to it back along the path of incidence while suppressing diffractions of orders other than those along the path of incidence. Thus, blazed grating 182 behaves as a flat specular surface except that it has frequency selectivity as a function of angle. Typically, the frequency selectivity of blazed grating 182 may be described as:

$$\frac{\lambda}{2} = \delta \cos \phi \qquad (4)$$

where $\delta$ is the line spacing and $\phi$ is the blaze angle. Tuning sensitivity may be described by:

$$\frac{d\lambda}{d\phi} = -2\delta \sin \phi \qquad (5)$$

Blazed grating 182 is fixedly attached to an element 188 of bimorph 184. As is well known, bimorph 184 comprises two piezoelectric elements or plates (188 and 190) which are cemented together in such a way that the application of an electric potential between them causes one of the elements to mechanically expand and the other one of the elements to mechanically contract. The resulting mechanical movement is depicted in FIG. 7. The amount of movement of grating 182 produced when electric potential is applied to bimorph 184 is dependent upon the effective pivot length of elements 188 and 190 (l) and the amount of angular deflection (d$\phi$) of the elements. The effect of the movement of elements 188 and 190 of bimorph 184 is to mechanically change the cavity length L of laser source 62. The amount of cavity length change is given by ld$\phi$. The amount of frequency tuning in the radiation produced by laser source 62 for a cavity length change of ld$\phi$ is given by:

$$\frac{d\lambda}{d\phi} = -\frac{l\lambda}{L} \qquad (6)$$

It is desirable that wide frequency deviation be produced by the single motion of grating 182. To achieve this effect, the following should be satisfied:

$$\left(\frac{d\lambda}{d\phi}\right)_{\text{cavity}} = \left(\frac{d\lambda}{d\phi}\right)_{\text{grating}} \qquad (7)$$

Provided that the above condition is met, then it can be said that:

$$\frac{l\lambda}{L} = 2\delta \sin \phi \qquad (8)$$

This is known as the "wide tuning condition" wherein a desired amount of FM deviation may be achieved by a single motion of elements 188 and 190 of bimorph 184. It is highly desirable that laser source 62 achieve this wide tuning condition if an adequate $\Delta f$ is to be obtained.

As is well known, half reflecting plate 186 reflects some of the radiation incident to it back into the laser cavity and permits some of the radiation incident to it to exit the laser cavity and be directed toward a desired point. Oscillation is thus produced within the laser cavity to amplify the wave produced by diode 178, thereby obtaining laser action.

FIG. 9 shows another embodiment of a laser source 62 in accordance with the present invention. A conventional graded index fibers (GRIN) lens 192 is substituted for half reflector plate 186, while another GRIN lens 194 is substituted from collimating lens 180 (FIG. 8). While lenses 192 and 194 could be microscope objectives or anamorphic compound lenses, the fiber-type lens produces better results. There are many other methods of mechanical tuning of a laser cavity employing alternate methods of achieving frequency selectivity and cavity length change, and the present invention is not limited to any one such method.

FIG. 10 shows another embodiment of laser source 62 which employs electronic tuning of an injection laser diode. Semiconductor lasers with controllable wavelength outputs are well known in the art. *See, e.g.* Fang et al, *Appl. Phys. Lett.*, Vol. 44, No. 1 (American Institute of Physics, Jan. 1, 1984); Reinhart & Logan, APL, Vol. 27, No. 10 (1975); Suematsu et al, *Electron Letters*, Volume 19, No. 17 (1983); Manning & Olshansky, *J.Q.E.* Qe-19, No. 10 (1983). The device disclosed in Fang et al obtains a total wavelength change of 61 Angstroms, a continuous tuning range of 4.1 Angstroms and a tuning rate of −0.74 Angstroms per mA.

Electronic tuning of an injection laser diode is accomplished by electronically producing an optical phase shift within a phase shift region 196 of the device. Phase shift by phase shift region 196 is equivalent to changing the electrical length of the laser cavity. Phase shift region 196 and an active (gain) region 198 (which actually produces the radiation) each include their own control electrode. A 60 Angstrom tuning range may be achievable electronically in the near future as research in this area continues.

RADAR TARGET CROSS SECTION

One of the difficulties which the present invention must overcome in order to obtain measurements of distances to an arbitrary target such as a diffuse surface is to achieve a sufficient signal-to-noise ratio. Unlike coherent interferometer distance measuring devices which use cooperative reflectors to return the beam to the sensor, the present invention depends on the light randomly scattered from the surface of a diffused target. The signal is thus weaker and more noisy, and the intensity of the radiation received from the target depends greatly on the surface roughness and absorption properties of the target. The radar cross section of a target is a conventional quantitative measure of the ratio of power density in the vector signal scattered in the direction of the receiver to the power density of the radiation incident upon the target, and is typically used to define the relevant target characteristics. Target cross section is given by the following expression:

$$\rho = 4\pi \frac{\text{Power reflected per unit solid angle}}{\text{Incident power per unit area}} \quad (9)$$

(where $\rho$ is target cross section).

In computing the target cross section for an optical diffuse surface, it is assumed that the net target cross section over the illuminated spot is the sum of the cross sections of individual scatterers, and that the individual scatterers are of the order of the wavelength of light and scatter the reflected light into a hemisphere ($2\pi$ steradians) or a Lambertian sphere ($\pi$ steradians).

The equivalent area of a single scatterer which scatters light into a hemisphere can be determined. Assuming the size of the surface element is $\delta$ then $$\left(\frac{\lambda}{\delta}\right)^2 = 2\pi \quad (10)$$

for a hemisphere or $$\left(\frac{\lambda}{\delta}\right)^2 = \pi \quad (11)$$

for a lambertian sphere. The area of one element is then $\delta^2$ and the target cross section for a single scatterer may be written as $$\rho_1 = 4\pi \frac{\rho_0 P_t/\Omega}{P_t/\delta^2} \quad (12)$$

$$(\rho_1)_{2\pi} = \rho_0 \frac{\lambda^2}{\pi} \quad (13)$$

$$(\rho_1)_{\pi} = 2\rho_0 \frac{\lambda^2}{\pi} \quad (14)$$

$\rho_0$ is defined as the reflectivity of the surface (i.e. the fraction of light not absorbed which is scattered away).

The power scattered back into the radar receiver for multiple scatterers is defined as the scalar sum of the power scattered from the individual single scatterers:

$$\rho_n = \sum_{i+1}^{n} \rho_i \approx n\rho_1 \quad (15)$$

(where n is the ratio of areas of the total illuminated area to the area of a single scatterer $\delta^2$). The target cross section for an array of end scatterers is thus:

$$\rho_{2\pi} = \rho_0 \frac{\lambda^2}{\pi} \cdot n \quad (16)$$

$$= 2\rho_0 \frac{\lambda^2 R^2}{d^2} \quad (17)$$

$$\rho_{\pi} = \frac{2\rho_0 \lambda^2}{\pi} \cdot n \quad (18)$$

$$= 4\rho_0 \frac{\lambda^2 R^2}{d^2} \quad (19)$$

It is observed that since the illuminated area A is given by $$A = \left(\frac{R\lambda}{d}\right)^2 \quad (20)$$

the results are consistent with the definition and concept of target cross section (i.e. $\rho_{2\pi} = 2_{92\ 0}A$ and $\rho_{90} = 4\rho_0 A$). If the scattering angle is the full $4\pi$ steradians, the target cross section is merely the area of the target times the reflection coefficient or $$\rho_{4\pi} = \rho_0 A. \quad (21)$$

RADAR RANGE EQUATION

The range equation for a radar in accordance with the present invention is substantially different from the conventional radar range equation due to special optical and geometrical differences between range measurement by microwave and range measurement by laser radiation. As is well known, the signal-to-noise ratio at the receiver of a radar is given by $$S/N = \frac{\text{Transmitter Power}}{\text{Receiver Noise Power}} \cdot \frac{\text{Target Cross Section}}{\text{Illuminated area}} \quad (22)$$

$$\frac{\text{Receiver Aperture Area}}{4\pi R^2}$$

or $$S/N = \frac{P_t}{N} \cdot \frac{\rho}{(R\theta_t)^2} \cdot \frac{d_r^2}{4\pi R^2} \quad (23)$$

$$\left(\text{where } \theta_t = \frac{\lambda}{d_t},\right.$$

$P_t$ is the laser transmitter power, N is the receiver noise power, $\rho$ is the target cross section, $d_r$ is the diameter of the receiver aperture diameter and R is the range). Equation 23 can be resolved with a conventional radar range equation by defining transmitter gain as $$G_t = \frac{4\pi d_t^2}{\lambda^2} \quad (24)$$

and receiver gain as $$G_r = \frac{4\pi d_r^2}{\lambda^2} \quad (25)$$

(Where $d_t$ is the transmitter aperture diameter and $d_r$ is the receiver aperture diameter). Solving for R and substituting in a threshold S/N parameter, the maximum range of the radar can be calculated as:

$$R^4 = \frac{P_t}{N} \cdot \frac{\rho}{S/N} \cdot G_t G_r \frac{\lambda^2}{(4\pi)^3} \quad (26)$$

For the continuous wave laser radar in accordance with the present invention, it is more convenient to use Equation 23. Substituting in Equation 23 for target cross section (as shown in Equations 17 and 19), we obtain $$S/N = \frac{P_t}{N} \frac{\rho_0}{2\pi} \frac{d^2}{R^2} \tag{27}$$

Setting the threshold S/N equal to δ and solving for R, the maximum range of the CW laser radar of the present invention is determined as $$R_{max} = \left(\frac{P_t}{N} \frac{\rho_0}{2\pi} \frac{1}{\sigma}\right)^{\frac{1}{2}} \cdot d \tag{28}$$

It should be observed that $R_{max}$ is not only dependent on the bracketed parameters but also on the antenna aperture diameter d. The bracketed parameters are known collectively as the radar performance parameter. As will soon be explained, the depth of range ΔR is directly dependent on the radar performance parameter.

RANGE COMPUTATION AND ACCURACY

Range computation for the present invention is done differently than in a conventional microwave radar. As mentioned previously, the present invention utilizes a reference channel to eliminate the dependence on laser frequency stability. A convention FM CW radar system (previously described) is shown in FIG. 1. The phase in the path between FM source 54 and target 52 is a function of frequency. Thus, as the frequency of the output of FM source 54 sweeps over a band Δf, the phase in the path changes by $$\Delta\phi = \frac{2\pi}{c} \Delta f R \tag{29}$$

The number of interference counts n which are detected is thus:

$$n = \frac{\Delta\phi}{\pi} \tag{30}$$

Solving Equation 29 for range, we obtain:

$$R = \frac{c}{2\Delta f} \cdot n \tag{31}$$

The precision or accuracy of the measurement is determined by the uncertainty in the counting of n. An average quantization error of ½ is expected, so that:

$$\frac{\delta R}{R} = \frac{1/2}{n} = \frac{c}{4R\Delta f} \tag{32}$$

or $$\delta R = \frac{c}{4\Delta f} \tag{33}$$

Assuming a precise measurement of Δf, this single channel technique is valid. However, in the CW laser radar, precise measurement of Δf is difficult if not impossible.

Since precise measurement of Δf (frequency sweep) should be avoided, the present invention uses a reference channel technique which makes computation of the range independent of laser frequency. As mentioned previously, the phase difference in the reference path ($n_{ref}$) and the phase difference in the ranging path ($n_r$) are measured separately and are given by the following:

$$n_{ref} = \Delta\phi_{ref}/\pi \tag{35}$$

$$n_r = \Delta\phi_r/\pi \tag{36}$$

As described previously, the range R may be calculated as:

$$R = \frac{n_r}{n_{ref}} \cdot X_{ref} \tag{37}$$

(where $X_{ref}$ is the length of the reference path).

From Equation 32, the practical range precision for a conventional FM CW radar may be written as $$\frac{\delta R}{R} = \frac{1}{2n} \tag{38}$$

The apparent quantization error in counting fringes is n=½ per linear sweep of the frequency. However, since the apparatus in accordance with the present invention has a reference channel with an associated reference range $X_{ref}$, there are three variables to be taken into account:

$$R = \frac{n}{n_{ref}} X_{ref} \tag{39}$$

Assuming the errors are random and gaussian distributed:

$$\left(\frac{\delta R}{R}\right)^2 = \left(\frac{\delta n}{n}\right)^2 + \left(\frac{\delta n_{ref}}{n_{ref}}\right)^2 + \left(\frac{\delta X_{ref}}{X_{ref}}\right)^2 \tag{40}$$

Equation 40 implies that the same quantization error applies to the reference channel as well as to the ranging channel. Thus, $$\left(\frac{\delta R}{R}\right)^2 = \left(\frac{1}{2n}\right)^2 + \left(\frac{1}{2n_{ref}}\right)^2 + \left(\frac{\delta X_{ref}}{X_{ref}}\right)^2 \tag{41}$$

It can be shown that $$n = \frac{2\Delta\lambda}{\lambda^2} R \text{ and } n_{ref} = \frac{2\Delta\lambda}{\lambda^2} X_{ref} \tag{43}$$

Substituting, $$\left(\frac{\delta R}{R}\right)^2 = \tag{44}$$

$$\left(\frac{1}{R} \cdot \frac{\lambda^2}{4\Delta\lambda}\right)^2 + \left(\frac{1}{R_{ref}} \cdot \frac{\lambda^2}{4\Delta\lambda}\right)^2 + \left(\frac{\delta X_{ref}}{X_{ref}}\right)^2$$

or, $$\delta R = \sqrt{\left(1 + \frac{R^2}{X^2_{ref}}\right)\left(\frac{\lambda^2}{4\Delta\lambda}\right)^2 + \left(\frac{R}{X_{ref}}\right)^2 \delta X^2_{ref}} \tag{45}$$

Assuming that R is approximately equal to $X_{ref}$, then $$\delta R = \sqrt{2\left(\frac{\lambda^2}{4\Delta\lambda}\right)^2 + \delta X^2_{ref}} \tag{46}$$

for a single sweep.

Equation 46 gives the precision achievable for each sweep $\Delta f$ of frequency deviation of laser source 62 (i.e. each half cycle of the waveform output of FM ramp generator 64) of the embodiment shown in FIG. 2. By independent statistical averaging of the measurements resulting from many sweeps, the error can be reduced by:

$$<\delta R> = \frac{\delta R}{\sqrt{N}} \tag{47}$$

(where N is the number of independent sample measurements taken). For a FM sawtooth frequency of $F_s$ and an integration time of $\tau$, the number of measurements averaged is:

$$N = 2F_s\tau \tag{48}$$

However, the averaging process does not apply to fixed $\delta X_{ref}$, but only to the quantization error of $N_r$ and $N_{ref}$. Thus, we have:

$$<\delta R> = \sqrt{\frac{1}{F_s\tau}\frac{(\lambda^2)^2}{4\Delta\lambda} + \delta X^2_{ref}} \tag{49}$$

FIG. 13 shows the precision $\delta R$ as a function of integration time $\tau$ in seconds for both a typical mechanically-modulated lasar source (such as that shown in FIG. 8) and for a typical electronically-modulated laser source (such as that shown in FIG. 10).

Note that integration time $\tau$ is dependent upon the number of sweeps $\Delta f$ performed for each point on target 52 as well as on the sweep rate. Counter 76 will typically limit the rate at which the frequency may be swept. Moreover, it is generally desirable that the sweep rate be as great as possible to permit more rapid measurement.

A conventional microwave radar utilizes a collimated beam output through an afocal antenna. For this arrangement, the near field effects of the antenna may be determined from:

$$R_{min} = d^2/\lambda \tag{50}$$

In a radar in accordance with the present invention, the beam power is relatively low and the range is expected to be relatively short. Under these conditions, near field effects of an afocal antenna pose a serious problem. FIG. 11 illustrates the maximum and minimum range of a 1 mW radar as a function of aperture diameter. The near field effects of the afocal antenna exceed the maximum range of the radar when the antenna is only 0.3 mm in diameter. At this point, the range is about 20 cm when extinction is observed.

In the present invention, a focal antenna is used wherein the radar beam is brought to focus at or near the target. Under these conditions, the depth of focus of the radar determines the useful operating range, and the focal range lies half-way between $R_{max}$ and $R_{min}$ (where $R_{max}$ is the maximum useful range and $R_{min}$ is the minimum useful range). The depth of focus may be determined from classical optics to be:

$$\Delta R = 2(R_f/d)^2\lambda \tag{51}$$

where $R_f$ is the focus range and $$R_{max} = R_f + \frac{\Delta R}{2} \tag{52}$$

For large values of range, the depth of focus is found to be nearly $$\Delta R \cong 2\left(\frac{R_{max}}{d}\right)^2 \lambda \tag{53}$$

or $$\Delta R \cong 2\left(\frac{P_t}{N}\frac{\rho}{2\pi\sigma}\right)\lambda \tag{54}$$

Solving for the performance parameters, we obtain $$\frac{P_t}{N}\frac{\rho_o}{2\pi\sigma} \geq \frac{\Delta R}{2\lambda} \tag{55}$$

Thus, the system in accordance with the present invention must meet the condition given in equation 55. Where this requirement is established, the relevant equations may be solved. Combining equation 51 with equation 52 yields the quadratic equation $$\frac{\lambda}{d^2} R_f^2 + R_f - R_{max} = 0 \tag{56}$$

When equation 56 is solved, the focal range $R_f$ is given by $$R_f = \frac{d^2}{2\lambda}\left(\sqrt{1 + \frac{4\lambda R_{max}}{d^2}} - 1\right) \tag{57}$$

The minimum range is defined as the maximum range less the depth of range and is found simply from equations 28, 52 and 55 as $$R_{min} = R_{max} - \Delta R \tag{58}$$

RADAR PERFORMANCE CALCULATIONS

A typical set of performance parameter definitions for a radar in accordance with the present invention is listed as follows:

$P_t$ (lasar transmitter power) typically 1 to 100 mW.

N (receiver noise power) is typically $4 \times 10^{-19} B_n W$ (where $B_n$ is the electronic noise bandwidth).

$\rho$ (target reflectivity) for a typical smooth white painted surface is 0.9; for a rough dark metal surface, $\rho = 0.01$.

Figure 14:
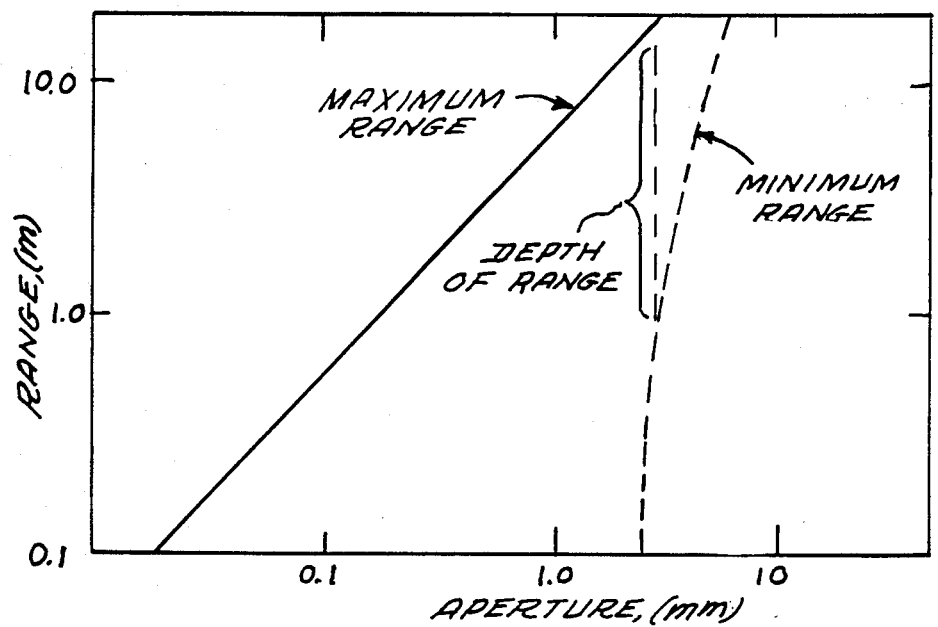
FIG. 14 is a graphical illustration of the maximum and minimum range (depth of range) as a function of aperture diameter in accordance with the present invention.

$\sigma$ (threshold signal-to-noise ratio) is typically 10 dB. FIGS. 12 and 14 graphically illustrate the maximum range, minimum range and depth of range values in accordance with the present invention for two representative sets of performance parameters.

SURFACE ROUGHNESS DETERMINATION

As will be recalled from FIGS. 3 and 4, measurement of the surface roughness of target 52 is possible in accordance with the present invention. A surface roughness processor 150 and a target tilt data generator 152 (as shown in FIGS. 3 and 4) perform this measurement. Target surface roughness is performed by analyzing the intensity of the beam reflected (scattered) by the target.

Parameters of surface roughness are determined in the present invention by two methods: by the reflectivity (scattering) versus tilt angle (i.e. reflectivity "profile"); and by the speckle pattern of the reflected (scattered) light. Both of these methods provide a target "signature" from which surface roughness may be determined.

The reflectivity profile is the target brightness (i.e. the intensity of the radiation reflected (scattered) by the target toward the detector) as a function of angle of incidence of the beam upon the surface of the target. Most targets are isotropic scatterers; that is, the target is brighter when the incident beam is normal to the surface. Experimentally obtained scattering profiles ("target signatures") for honed steel, rough steel, rough machined steel and white paper as a function of tilt angle are shown in FIG. 16.

Theoretical models of scattering profiles have been derived based upon two surface roughness parameters: $\sigma$ (the RMS height of the surface irregularities); and T (the correlation distance between the peaks of the irregularities). FIG. 17 graphically illustrates these two parameters. Due to the complexity of arbitrary surfaces, most models are simplifications and are not entirely accurate. However, the scattering profile is truly unique for a particular surface and therefore comprises a true signature. Experimentally measured reflectivity profiles of standard surfaces versus angle of incidence are correlated with microscopic measurements which precisely indicate $\sigma$ and T. The surface roughness processor in accordance with the present invention may then characterize unknown target surfaces by comparing them with the experimentally-measured results. Approximation algorithms providing "best fit" curve fitting and statistical processes which eliminate systematic errors are also used.

Another method of determining surface roughness is by measuring speckle pattern. When coherent light is scattered by an irregular diffuse surface, interference effects cause what is known is "speckle," a modulation of the scattered light intensity as a function of angle of incidence. The relation between speckle and surface parameters $\sigma$ and T have been derived theoretically and have been confirmed experimentally. See Asakura, T. *Speckle Metrology* (Academic Press, New York 1978). Speckle contrast (modulation index depth) $C = k\sigma$ is directly proportional to the surface roughness parameter $\sigma$. It can also be shown that the number of speckles in the pattern (spatial frequency) is given by $F = 2d/T$ (where d is the laser spot size and T is the correlation distance). FIGS. 18(A)-18(B) illustrate these effects.

A model of speckle contrast in accordance with the present invention will now be discussed.

An illuminated spot of diameter s is assumed to be comprised of an array of n random scatterers, all of which contribute to the contrast modulation of the scattered light in the far field. The size of the elemental scatterers is a function of the surface roughness of the target, and will consist of a distribution of sizes about some average value $\delta s$. The total number of scatterers over the illuminated spot is then $$n = \left(\frac{S}{\sigma_s}\right)^2 \quad (59)$$

Since power scattered into a small detector in the far field is subject to statistical fluctuation of the phase of the light from the array of scatterers, it follows that the peak (maximum) intensity will be an average value plus a variance value and that the minimum intensity will be the average value minus the variance value. Thus, $$I_{peak} = I_{av} + \frac{I_{av}}{\sqrt{n}} \quad (60)$$

and $$I_{min} = I_{av} - \frac{I_{av}}{\sqrt{n}} \quad (61)$$

Defining speckle contrast C as the peak intensity minus minimum intensity divided by the average intensity, we obtain $$C = \frac{I_{peak} - I_{min}}{I_{ave}} \quad (62)$$

$$= 2\sqrt{n} \quad (63)$$

$$= \frac{2\delta_s}{S} \quad (64)$$

This simple contrast model exhibits a linear dependence on surface roughness and an inverse dependence on spot size. Reported experimental results of Asakura, P. *Speckle Metrology* (Academic Press, New York, 1978) show a linear dependence and agrees with the above equation for a spot size of 0.63 micrometers. The lens Asakura used to focus the laser is not mentioned, but an F#1 lens with a helium neon laser would give the measured results and would be consistent with the model in accordance with the present invention.

Measurement of contrast can be achieved by measuring intensity while tilting the target sample through one diffraction angle of the illuminated spot, $\delta_\alpha$, where the appropriate angle from a peak to a minimum in the radiation pattern is given by $$\delta_\alpha \simeq \lambda/s \quad (65)$$

For a typical radar beam spot size of 1 millimeter in diameter, the speckle defraction angle $\delta_\alpha$ equals 1 milliradian. The contrast seen by a fixed detector in the radiation field is then $$C \simeq 2 \cdot 10^{-3} \delta_s \quad (66)$$

(where $\delta_s$ is in micrometers).

FIG. 19 shows a typical speckle pattern from a diffuse surface as a function of angle of incidence. Speckle contrast C is given by $$C = K\sigma = \frac{I_{max} - I_{min}}{I_{avg}} \quad (67)$$

-continued or $$\sigma = \frac{1}{k} \frac{I_{max} - I_{min}}{I_{avg}} \quad (68)$$

(where $\sigma$ is the surface roughness parameter). Similarly $\sigma\theta_o$ (the speckle size, i.e. the angular displacement of the modulations in the speckle pattern or, in other words, the spatial frequency of the modulations in the speckle pattern) can be measured by tilting the target, changing the laser frequency or by scanning the beam slightly (as will be discussed in conjunction with FIGS. 15(A)–(C)). From speckle size, we can determine the number of speckles in the beam (for a one-dimensional scan) from $$\frac{\theta_o}{\delta\theta_o} = \frac{2d}{T} \quad (69)$$

(where $\theta_o$ is the speckle size).

$$T = \frac{2d}{\theta_o} \delta\theta_o \quad (70)$$

Figure 15A:
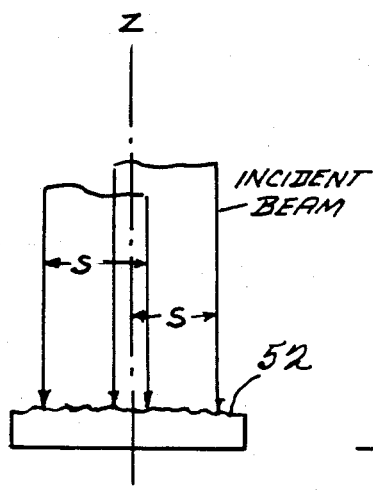
FIG. 15(A) is a schematic illustration of a first method of producing a speckle pattern in accordance with the present invention by scanning the beam across the surface the roughness of which is to be characterized.
Figure 15B:
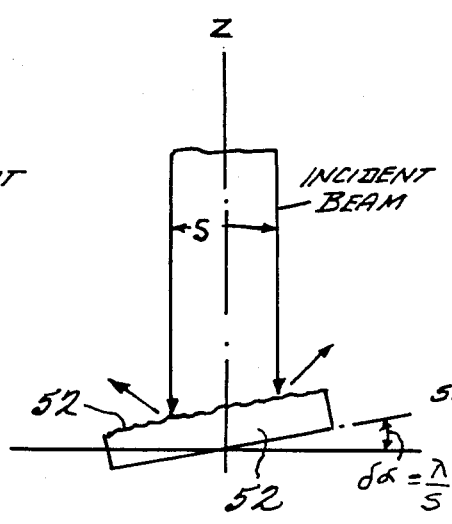
FIG. 15(B) is a schematic illustration of a second method in accordance with the present invention for characterizing the roughness of a surface by changing the angle of incidence of a beam striking the surface by tilting the surface.
Figure 15C:
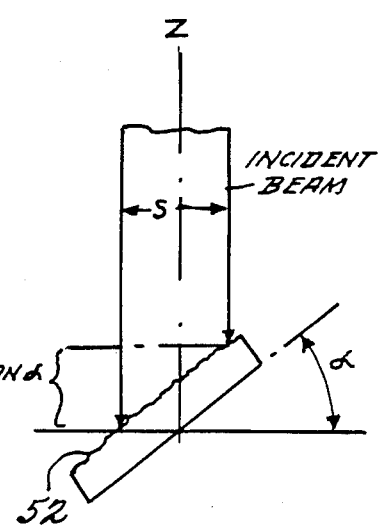
FIG. 15(C) is a schematic illustration of a third method in accordance with the present invention for producing a speckle pattern by varying the frequency of the beam striking the surface the roughness of which is to be characterized.

Referring to FIGS. 15(A)–(C), three different arrangements in accordance with the present invention for producing target signature data are shown. In FIG. 15(B), the target 52 is tilted through an angle $\delta_\alpha$ while the intensity of the portion of the beam scattered by the target toward a detector is measured. The detector could be positioned anywhere in the radiation field, although the same detector arrangement is used in the preferred embodiment to measure both phase difference and intensity.

Speckle contrast (but not reflectivity profile) may also be determined by holding the sample still and varying the frequency of the laser (as is shown in FIG. 15(C)). However, for the frequency scan type of measurement, the sample must be inclined to introduce a path difference across the illuminated spot. A path difference of s(tan $\alpha$) is obtained between the two opposite sides of the beam incident to the target surface. For the arrangement shown in FIG. 15(C) where the path difference is given by s(tan $\alpha$), the phase difference may be written as $$\Delta\phi = 2\pi \frac{\Delta f}{c} s(\tan \alpha) \quad (71)$$

Letting the phase difference equal one half cycle and solving for the required frequency scan width as a function of $\alpha$ yields the following result:

$$\Delta f = \frac{c}{2s(\tan \alpha)} \quad (72)$$

For a tilt angle of one radian, the laser source 62 must be tuned over a two Angstrom width; for a tilt angle of ten degrees, laser source 62 must be tuned over an eighteen Angstrom width. Obviously the frequency scan method cannot be used when the incident beam is normal to the target.

FIG. 15(A) shows yet another method of measuring speckle contrast. The incident beam is moved slightly ("scanned") across the surface of the target, and the resulting speckle pattern is detected. This method provides the most satisfactory results since it avoids the problems discussed above.

The surface roughness processor 150 shown in FIGS. 3 and 4 measures the intensity of the signal reflected (scattered) by the target by monitoring the automatic gain control voltage output of differential amplifier 144. Target tilt data generator block 152 provides information of the instantaneous angle of incidence of the beam on the surface of target 52. Depending upon the application, of course, target tilt data generator 152 will produce this information in different ways. For instance, if the method shown in FIG. 15(b) is used and the target is tilted mechanically, target tilt data generator 152 might process the output of resolvers operatively connected to the mechanical device (not shown) used to tile the target in order to produce information of target tilt. Alternatively, collimator 124 (or 168) could be tilted in position to change the angle of beam incidence. In this case, target tilt data generator 152 would be coupled to resolvers operatively connected to the mechanical device used to position the collimator to provide target tilt information. If the surface of target 52 is complex rather than substantially flat, further information might be required to compute the angle of incidence. This information could be obtained by mapping the surface of target 52 using ranging measurements performed as discussed previously (by scanning the beam over the surface and determining range for each dwell point), and then using the mapped contour information to compute instantaneous angle of incidence.

Surface roughness processor 150 in accordance with the present invention uses both the reflectivity profile and the speckle contrast methods (discussed previously) to ascertain surface roughness parameters $\sigma$ and T. The parameters calculated by the two methods can be correlated for accuracy. As mentioned previously, surface roughness processor 150 produces surface roughness parameters $\alpha$ and T by comparing experimentally-measured reflectivity profiles and speckle contrasts with a stored library of similar information for standard surfaces the surface roughness parameters of which have been accurately measured (such as by electron microscopy).

It will be understood that the above description is of illustrative embodiments of the present invention, and that the invention is not limited to the specific forms shown. Those skilled in the art will appreciate that many variations and modifications may be made in these exemplary embodiments without departing from the novel and advantageous features of this invention. Accordingly, all such variations and modifications are intended to be included within the scope of the following claims.

What is claimed is:

1. An apparatus for measuring the distance to an arbitrary target, said apparatus comprising:
   radiation source means for producing a beam of coherent radiation, said radiation source means including frequency modulating means for frequency sweep modulating the frequency of said radiation;
   first beam splitting means, optically coupled to said radiation source means, for dividing said beam into a ranging beam and a reference beam;
   ranging interferometer means, optically coupled to said first beam splitting means, for directing a first portion of said ranging beam along a path toward said target and for producing a first wave interference pattern between a second portion of the ranging beam travelling over a first path and the first portion of the ranging beam scattered by said target, said ranging interferometer means including focusing means for focusing said ranging beam first portion onto said target;

reference interferometer means, optically coupled to said first beam splitting means, for directing a first portion of said reference beam along a reference path of fixed predetermined known length and for producing a second wave interference pattern between a second portion of said reference beam travelling over a second path and the first portion of said reference beam travelling over said reference path;

processing means, responsive to said first and second wave interference patterns, for determining the length of path between said ranging interferometer means and said target, said processing means including tracking filter means for filtering noise from said first wave interference pattern; and surface roughness processing means, responsive to the amplitude of said first wave interference pattern produced by said ranging interferometer means, for characterizing the roughness of the scattering surface to said target.

2. An apparatus as in claim 1 wherein said surface roughness processing means includes:
means for varying the angle of incidence of said beam on said surface;
means, coupled to said ranging interferometer means, for detecting the amplitude of said first wave interference pattern, said detected amplitude proportional to the intensity of the radiation scattered by said surface; and
data processing means for processing the detected amplitude of said first wave interference pattern for a plurality of angles of incidence to produce indicia of said surface roughness.

3. An apparatus as in claim 2 wherein said angle varying means includes means for changing the position of said target.

4. An apparatus as in claim 2 wherein angle varying means includes means for changing the direction of the first portion of said ranging beam.

5. An apparatus as in claim 2 wherein:
said ranging interferometer means includes means for successively directing said first portion of said ranging beam onto a plurality of points on said surface of said target; and
said data processing means includes:
means for storing the determined length of the path from said ranging interferometer means to each of said plurality of points on said surface; and
means for estimating the angle of incidence of said first portion of said ranging beam on each of said plurality of points from said determined length of the paths to said plurality of points.

6. An apparatus as in claim 2 wherein said data processing means includes:
means for storing experimentally-obtained data comprising sets of a plurality of intensities of scattered coherent radiation as a function of angle of incidence for a plurality of different predetermined surfaces; and
means for comparing said detected intensities for a plurality of angles of incidence with said stored sets in order to approximate the roughness of said surface by the roughness of one of said predetermined surfaces.

7. An apparatus as in claim 2 wherein:
said amplitude-detecting means further includes means for characterizing modulations in the scattered radiation, said modulations produced by interference between radiation scattered by different points of said surface; and
said data processing means further includes means for deriving, from said characterization of the modulations, indicia of the roughness of said surface.

8. An apparatus as in claim 7 wherein:
said means for characterizing includes:
means for measuring the peak-to-peak amplitude of said modulations; and
means for measuring the angular displacement of said modulations; and said deriving means includes:
means for storing experimentally-obtained data comprising the peak-to-peak amplitudes and angular displacements of the modulations in coherent radiation scattered by a plurality of different predetermined surfaces, said modulations for each of said different surfaces produced by interference between radiation scattered by different points on said each surface; and
means for comparing said measured peak-to-peak amplitude and angular displacement data with said stored peak-to-peak amplitude and angular displacement data in order to approximate the roughness of said surface by the roughness of one of said predetermined surfaces.

9. An apparatus as in claim 1 wherein said surface roughness processing means includes:
detecting means, coupled to said ranging interferometer means, for detecting the amplitude of said first wave interference pattern, said detected amplitude proportional to the intensity of the radiation scattered by the surface;
characterizing means, responsive to said detected amplitudes, for characterizing modulations in the scattered radiation, said modulations produced by interference between portions of said first portion of said ranging beam scattered by different points on said surface; and
means for deriving, from said characterization of the modulations, indicia of the roughness of said surface.

10. An apparatus as in claim 9 wherein:
said means for characterizing includes:
means for measuring the peak-to-peak amplitude of said modulations; and
means for measuring the angular displacement of said modulations; and said deriving means includes:
means for storing experimentally-obtained data comprising the peak-to-peak amplitudes and angular displacements of the modulations in coherent radiation scattered by a plurality of different predetermined surfaces, said modulations for each of said different surfaces produced by interference between radiation scattered by different points on said each surface; and
means for comparing said measured peak-to-peak amplitude and angular displacement data with said stored peak-to-peak amplitude and angular displacement data in order to approximate the roughness of said surface by the roughness of one of said predetermined surfaces.

11. An apparatus as in claim 10 wherein said characterizing means includes means for scanning said first portion of said ranging beam over said surface.

12. An apparatus as in claim 10 wherein said characterizing means includes means for changing the angle of incidence of said beam on said surface.

13. An apparatus for measuring the distance to an arbitrary target, said apparatus comprising:
radiation source means for producing a beam of coherent radiation, said radiation source means including means for sweeping the frequency of said produced radiation from a first to a second frequency, said sweep defined by a continuously increasing function of time;
first star coupling means, including an input port and first and second output ports, said radiation source means coupled to said input port, said first star coupling means for splitting said beam produced by said radiation source means into a ranging beam and a reference beam, said ranging beam exiting said first star coupling means at said first output port, said reference beam exiting said first star coupling means at said second output port;
ranging beam splitting star coupling means, including an input port and first and second output ports, for splitting said ranging beam into first and second beams, said first beam produced at said first output port, said second beam produced at said second output port, said ranging beam splitting star coupling means including means for coupling said input port of said ranging beam splitting star coupling means to said first output port of said first star coupling means;
first lens means, coupled to said first output of said ranging beam splitting star coupling means, for focusing said first beam on said target;
ranging beam combining star coupling means for combining said first and second beams to produce a first wave interference pattern, said ranging beam combining star coupling means including first and second input ports and at least one output port;
first optical fiber means for coupling said second output port of said ranging beam splitting star coupling means to said second input port of said ranging beam combining star coupling means, said first optical fiber means defining a fixed path length;
second lens means positioned in proximity with said first lens means and aimed at said target, for coupling a portion of said first beam scattered by said target to said first input port of said ranging beam combining star coupling means;
ranging detector means, coupled to said output port of said ranging beam combining star coupling means, for detecting the fringes in said first wave interference pattern;
ranging counting means, responsive to said detected fringes of said ranging detector means, for counting the number of fringes $N_r$ in said first wave interference pattern produced during said sweep in frequency;
reference beam splitting star coupling means, including an input port and first and second output ports, for splitting said ranging beam into third and fourth beams, said third beam produced at first output port, said fourth beam produced at said second output port, said reference beam splitting star coupling means including means for coupling said input port of said reference beam splitting star coupling means to said second output port of said first star coupling means;
reference beam combining star coupling means for combining said third and fourth beams to produce a second wave interference pattern, said reference beam combining star coupling means including first and second input ports and at least one output port;
second optical fiber means for coupling said second output port of said reference beam splitting star coupling means to said second input port of said reference beam combining star coupling means, said second optical fiber means defining a fixed path length;
reference optical fiber means for coupling said first output port of said reference beam splitting star coupling means to said first input port of said reference beam combining star coupling means, said reference optical fiber means defining a path of predetermined known fixed length $X_{ref}$, $X_{ref}$ being approximately equal to the distance R to be measured;
reference detector means, coupled to said output port of said reference beam combining star coupling means, for detecting the fringes in said second wave interference pattern;
reference counting means, responsive to said detected fringes of said references detector means, for counting the number of fringes $N_{ref}$ in said second wave interference pattern produced during said sweep in frequency;
tracking filter means, connected between said ranging detector means and said ranging counting means, for filtering noise from said first pattern detected fringes;
processing means, responsive to said counts $N_r$ and $N_{ref}$, for calculating the distance R to said target, said distance R given by $$R = \frac{N_r}{N_{ref}} \cdot X_{ref};$$

and surface roughness processing means, responsive to the amplitude of the fringes detected by said ranging detector means, for characterizing the roughness of the scattering surface of said target scattering said first beam.

14. An apparatus as in claim 13 wherein said surface roughness processing means includes:
means for varying the angle of incidence of said first beam on said surface;
means, coupled to said ranging detector means, for measuring the amplitude of said first wave interference pattern, said measured amplitude proportional to the intensity of the portion of said first beam scattered by said surface; and
data processing means for processing said measured amplitude of said first wave interference pattern for a plurality of angles of incidence to produce indicia of said surface roughness.

15. An apparatus as in claim 14 wherein said data processing means includes:
means for storing experimentally-obtained data comprising sets of a plurality of intensities of scattered coherent radiation as a function of angle of incidence for a plurality of different predetermined surfaces; and means for comparing said detected intensities for a plurality of angles of incidence with said stored sets in order to approximate the roughness of said surface by the roughness of one of said predetermined surfaces.

16. An apparatus as in claim 14 wherein said:

said amplitude measuring means further includes means for characterizing amplitude modulations in the portion of said first beam scattered by said surface, said modulations produced by interference between radiation scattered by different points on said surface; and said data processing means further includes means for deriving, from said characterization of the modulations, indicia of the roughness of said surface.

17. An apparatus as in claim 16 wherein:

said means for characterizing includes:

means for measuring the peak-to-peak amplitude of said modulations; and means for measuring the angular displacement of said modulations; and said deriving means includes:

means for storing experimentally-obtained data comprising the peak-to-peak amplitudes and angular displacements of the modulations in coherent radiation scattered by a plurality of different predetermined surfaces, said modulations for each of said different surfaces produced by interference between radiation scattered by different points on said each surface; and means for comparing said measured peak-to-peak amplitude and angular displacement data with said stored peak-to-peak amplitude and angular displacement data in order to approximate the roughness of said surface by the roughness of one of said predetermined surfaces.

18. An apparatus as in claim 13 wherein said surface roughness processing means includes:

means, coupled to said ranging detector means, for measuring the amplitude of said first wave interference pattern, said measured amplitude proportional to the intensity of the portion of said first beam scattered by said surface;

characterizing means, responsive to said detected amplitude, for characterizing modulations in the scattered radiation, said modulations produced by interference between portions of said first beam scattered by said different points on said surface; and means for deriving, from said characterization of the modulations, indicia of the roughness of said surface.

19. An apparatus as in claim 18 wherein:

said means for characterizing includes:

means for measuring the peak-to-peak amplitude of said modulations; and means for measuring the angular displacement of said modulations; and said deriving means includes:

means for storing experimentally-obtained data comprising the peak-to-peak amplitudes and angular displacements of the modulations in coherent radiation scattered by a plurality of different predetermined surfaces, said modulations for each of said different surfaces produced by interference between radiation scattered by different points on said each surface; and means for comparing said measured peak-to-peak amplitude and angular displacement data with said stored peak-to-peak amplitude and angular displacement data in order to approximate the roughness of said surface by the roughness of one of said predetermined surfaces.

20. An apparatus as in claim 19 wherein said characterizing means includes means for scanning said first beam over said surface.

21. An apparatus as in claim 19 wherein said characterizing means includes means for changing the angle of incidence of said beam on said surface.

22. An apparatus for determining the roughness of a surface, comprising:

radiating means for directing a continuous beam of coherent radiation onto said surface, said radiating means including means for frequency sweep modulating the frequency of said radiation;

beam splitting means for splitting said radiation into a ranging beam and a reference beam;

ranging interferometer means optically coupled to said radiating means, for directing a first portion of said ranging beam along a path toward said surface, and for producing a first wave interference pattern between a second portion of the ranging beam travelling over a predetermined path and the first portion of said ranging beam scattered by said surface, and for providing an output signal proportional to the amplitude of the first wave interference pattern;

reference interferometer means for directing a first portion of said reference beam along a reference path of fixed, predetermined length, and for producing a second wave interference pattern between a second portion of said reference beam travelling over a second path and said first portion of said reference beam travelling over said reference path;

means for varying the angle of incidence of said first portion of said ranging beam on said surface;

detecting means for detecting the intensity of said radiation scattered by said surface for a plurality of different ones of said angles of incidence, said intensity corresponding to said output signal of said ranging interferometer means; and processing means for processing said detected intensities and said first and second wave interference patterns to produce indicia of surface roughness.

23. An apparatus as in claim 22 wherein said processing means includes:

means for storing experimentally-obtained data comprising sets of a plurality of intensities of scattered coherent radiation as a function of angle of incidence for a plurality of different predetermined surfaces; and means for comparing said detected intensities for a plurality of angles of incidence with said stored sets in order to approximate the roughness of said surface by the roughness of one said predetermined surfaces.

24. An apparatus as in claim 22 wherein:

said detecting means further includes means for characterizing modulations in the scattered radiation, said modulations produced by interference between radiation scattered by different prints on said surface; and said processing means further includes means for deriving, from said characterization of the modulations, indicia of the roughness of said surface.

25. An apparatus as in claim 24 wherein:
said means for characterizing includes:
   means for measuring the peak-to-peak amplitude of said modulations; and
   means for measuring the angular displacement of said modulations; and said deriving means includes:
   means for storing experimentally-obtained data comprising the peak-to-peak amplitudes and angular displacements of modulations in radiation scattered by a plurality of different predetermined surfaces, said modulations for each of said different surfaces produced by interference between radiation scattered by different points on said each surface; and
   means for comparing said measured peak-to-peak amplitude and angular displacement data with said stored peak-to-peak amplitude and angular displacement data in order to approximate the roughness of said surface by the roughness of one of said predetermined surfaces.

26. An apparatus as in claim 25 wherein said means for characterizing further includes for means for scanning said beam over said surface.

27. An apparatus as in claim 22 wherein said means for varying the angle of incidence comprises one of means for changing the position of said radiating means and means for changing the position of said surface.

28. An apparatus for determining the roughness of a surface, comprising:
   radiating means for directing a continuous beam of coherent radiation onto said surface, said radiating means including means for frequency sweep modulating the frequency of said radiation;
   beam splitting means for splitting said radiation into a ranging beam and a reference beam;
   ranging means, optically coupled to said radiating means, for directing a first portion of said ranging beam along a path toward said surface, and for producing a first wave interference pattern between a second portion of the ranging beam travelling over a predetermined path and the first portion of said ranging beam scattered by said surface, and for providing an output signal proportional to the amplitude of the first wave interference pattern;
   reference interferometer means for directing a first portion of said reference beam along a reference path of fixed, predetermined length, and for producing a second wave interference pattern between a second portion of said reference beam travelling over a second path and said first portion of said reference beam travelling over said reference path;
   detecting means for detecting the intensity of the radiation scattered by said surface, said intensity corresponding to the output signal from said ranging means;
   characterizing means, responsive to said detected intensity, for characterizing modulations in the scattered radiation, said modulations produced by interference between radiation, scattered by different points on said surface; and
   means for deriving from said characterization of the modulations and said first and second wave interference patterns, indicia of the roughness of said surface.

29. An apparatus as in claim 28 wherein:
said means for characterizing includes:
   means for measuring the peak-to-peak amplitude of said modulations; and
   means for measuring the angular displacement of said modulations; and said deriving means includes:
   means for storing experimentally-obtained data comprising the peak-to-peak amplitudes and angular displacements of modulations in coherent radiation scattered by a plurality of different predetermined surfaces, said modulations for each of said difference surfaces produced by interference between radiation scattered by different points on said each surface; and
   means for comparing said measured peak-to-peak amplitude and angular displacement data with said stored peak-to-peak amplitude and angular displacement data in order to approximate the roughness of said surface by the roughness of one of said predetermined surfaces.

30. An apparatus as in claim 28 wherein said characterizing means includes means for scanning said beam over said surface.

31. A method for measuring the distance to an arbitrary target, comprising the steps of:
   (1) producing a beam of coherent radiation;
   (2) frequency sweep modulating the frequency of said radiation;
   (3) dividing the beam into a ranging beam and a reference beam;
   (4) directing a first portion of said ranging beam along a path toward said target, and focusing said ranging beam on said target;
   (5) producing a first wave interference pattern between the first portion of said ranging beam scattered by said target and a second portion of said ranging beam traveling over another path, and track filtering said first wave interference pattern to reduce noise therein;
   (6) directing a first portion of said reference beam along a reference path of a first, predetermined known length;
   (7) producing a second wave interference pattern between the first portion of said reference beam over said reference path and a second portion of said reference beam traveling over another path
   (8) processing said first and second wave interference patterns to determine the distance to said target; and characterizing the roughness of said scattering surface of said target.

32. A method as in claim 31 wherein said surface roughness characterizing step includes the steps of:
   varying the angle of incidence of said beam on said surface;
   measuring the amplitude of said first wave interference pattern produced by said producing step (5), said detected amplitude proportional to the intensity of the radiation scattered by said surface; and
   processing the detected amplitude for a plurality of angles of incidence to produce indicia of said surface roughness.

33. A method as in claim 32 wherein said detected amplitude processing step includes the steps of:
   storing experimentally-obtained data comprising a set of a plurality of intensities of scattered coherent radiation as a function of angle of incidence for each of a plurality of different predetermined surfaces; and comparing said detected intensities with said stored intensities in order to approximate the roughness of said surface by the roughness of one of said predetermined surfaces.

34. A method as in claim 33 wherein:

said amplitude detecting step includes the step of characterizing modulations in the scattered radiation, said modulations produced by interference between radiation scattered by different points on said surface; and said amplitude processing means further includes the step of deriving, from said characterization of the modulations, indicia of the roughness of said surface.

35. A method as in claim 34 wherein:

said modulation characterizing step includes the steps of:

measuring the peak-to-peak amplitude of said modulations; and measuring the angular displacement of said modulations; and said surface roughness indicia deriving step includes the steps of:

storing experimentally obtained data comprising the peak-to-peak amplitudes and angular displacements of modulations in coherent radiation scattered by a plurality of different predetermined surfaces, said modulations for each of said different surfaces produced by interference between radiation scattered by different points on said each surface; and comparing said measured peak-to-peak amplitude and angular displacement data with said stored peak-to-peak amplitude and angular displacement data in order to approximate the roughness of said surface by the roughness of one of said predetermined surfaces.

36. A method as in claim 32 wherein:

said angle varying step includes the step of successively directing said first portion of said ranging beam onto a plurality of points on said surface, said steps (5)–(8) being performed for each of said plurality of points; and said detected amplitude processing step includes the step of estimating an angle of incidence of said beam onto each of said plurality of points from the plurality of determined distances produced by said processing step (8).

37. A method as in claim 36 wherein said detected amplitude processing step further includes the step of storing said plurality of determined distances.

38. A method as in claim 31 wherein said surface roughness characterizing step includes the steps of:

detecting the amplitude of said first wave interference pattern, said detected amplitude proportional to the intensity of the radiation scattered by said surface;

characterizing modulations in the intensity of said scattered radiation, said modulations produced by interference between portions of said beam scattered by different points on said surface; and deriving, from said characterization of the modulations, indicia of the roughness of said surface.

39. A method as in claim 38 wherein:

said modulation characterizing step includes the steps of:

measuring the peak-to-peak amplitude of said modulations; and measuring the angular displacement of said modulations; and said surface roughness indicia deriving step includes the steps of:

storing experimentally-obtained data comprising the peak-to-peak amplitudes and angular displacements of modulations in coherent radiation scattered by a plurality of different predetermined surfaces, said modulations for each of said difference surfaces produced by interference effects between radiation scattered by different points on said surface; and comparing the measured peak-to-peak amplitude and angular displacement data with said stored peak-to-peak amplitude and angular displacement data in order to approximate the roughness of said surface by the roughness of one of said predetermined surfaces.

40. A method as in claim 39 wherein said modulation characterizing step further includes a step of scanning said first portion of said ranging beam over said surface.

41. A method for determining the roughness of a surface, comprising the steps of:

directing a beam of coherent radiation onto said surface, the frequency of said radiation being frequency sweep modulated;

splitting said radiation into ranging and reference beams;

directing a first portion of said ranging beam along a path toward said surface;

producing a first wave interference pattern between a second portion of the ranging beam travelling over a predetermined path and the first portion of said ranging beam scattered by said surface;

providing an output signal proportional to the amplitude of said first wave interference pattern;

directing a first portion of said reference beam along a path of fixed, predetermined length;

producing a second wave interference pattern between a second portion of said reference beam travelling over a second path and said first portion of said reference beam travelling over said reference path;

varying the angle of incidence of said first portion of said ranging beam on said surface;

detecting the intensity of said radiation scattered by said surface for a plurality of different ones of said angles of incidence, said intensity corresponding to said output signal; and processing said detected intensities and said first and second wave interference patterns to produce indicia of surface roughness.

42. A method as in claim 41 wherein said detecting step includes a step of characterizing modulations in the intensity of said scattered radiation, said modulations produced by interference between portions of said radiation scattered by different points on said surface.

43. A method as in claim 42 wherein said processing step includes the steps of:

storing a detected intensity for each of a plurality of angles of incidence; and comparing said stored intensities with stored experimentally-obtained data comprising intensities of scattered radiation as a function of angles of incidence for a plurality of different predetermined surfaces in order to characterize surface roughness of said surface.

44. A method as in claim 42 wherein said varying step includes the step of changing the orientation of said surface.

45. A method as in claim 42 wherein said varying step includes a step of changing the direction of said beam.

46. A method for determining the roughness of a surface, comprising the steps of:
   directing a beam of coherent radiation onto said surface, the frequency of said radiation being frequency sweep modulated;
   splitting said radiation into ranging and reference beams;
   directing a first portion of said ranging beam along a path toward said surface;
   producing a first wave interference pattern between a second portion of the ranging beam travelling over a predetermined path and the first portion of said ranging beam scattered by said surface;
   providing an output signal proportional to the amplitude of the first wave interference pattern;
   detecting the intensity of the radiation scattered by said surface, said intensity corresponding to said output signal;
   directing a first portion of said reference beam along a path of fixed, predetermined length;
   producing a second wave interference pattern between a second portion of said reference beam travelling over a second path and said first portion of said reference beam travelling over said reference path;
   characterizing modulations in the intensity of the scattered radiation, said modulations produced by interference between portions of said radiation scattered by different points on said surface; and
   deriving, from said characterization of the modulations and from said first and second wave interference patterns, indicia of roughness of said surface.

47. A method as in claim 46 wherein:
   said characterizing step includes the step of:
      measuring the peak-to-peak amplitude of said modulations; and
      measuring the angular displacement of said modulations; and
   said deriving step includes the steps of:
      storing experimentally-obtained data comprising the peak-to-peak amplitudes and angular displacements of modulations in coherent radiation scattered by a plurality of different predetermined surfaces, said modulations for each of said difference surfaces produced by interference between different portions of said scattered variation; and
      comparing said measured peak-to-peak amplitude and angular displacement data with said stored peak-to-peak amplitude and angular displacement data in order to approximate the roughness of said surface by the roughness of one said predetermined surfaces.

48. A method as in claim 46 wherein said characterizing step (3) includes the step of scanning said beam across said surface.

49. A method as in claim 46 wherein said characterizing step includes the step of frequency modulating said beam.

50. A method as in claim 46 wherein said characterizing step includes the step of changing the angle of incidence of said beam on said surface.

* * * * *